US011475766B1

(12) United States Patent
Carson et al.

(10) Patent No.: US 11,475,766 B1
(45) Date of Patent: Oct. 18, 2022

(54) SYSTEMS AND METHODS FOR USER REPORTING OF TRAFFIC VIOLATIONS USING A MOBILE APPLICATION

(71) Applicant: Hayden AI Technologies, Inc., Oakland, CA (US)

(72) Inventors: Christopher Carson, Oakland, CA (US); Vaibhav Ghadiok, Mountain View, CA (US); Bo Shen, Fremont, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 0 days.

(21) Appl. No.: 17/451,370

(22) Filed: Oct. 19, 2021

Related U.S. Application Data

(60) Provisional application No. 63/175,789, filed on Apr. 16, 2021.

(51) Int. Cl.
*G08G 1/017* (2006.01)
*G06T 7/38* (2017.01)
(Continued)

(52) U.S. Cl.
CPC ......... *G08G 1/0175* (2013.01); *G06F 16/434* (2019.01); *G06T 7/38* (2017.01);
(Continued)

(58) Field of Classification Search
CPC ............... B60R 1/00; B60R 2300/105; B60R 2300/303; B60R 2300/302; B60R 21/01538; B60R 2001/1215; B60R 2300/30; B60R 2300/50; G06V 20/56; G06V 20/58; G06V 20/588; G06V 20/584; G06V 20/52; G06V 10/82; G06T 2207/30252; G06T 2207/30261; G06T 2207/10016; G06T 7/70; G06T 2207/10028; G06T 2207/30256; G06T 2207/20081; G06T 7/73; G06T 7/20;
(Continued)

(56) References Cited

U.S. PATENT DOCUMENTS

| 9,916,755 B1 * | 3/2018 | Ratti ................... G06Q 30/0207 |
| 2003/0189499 A1 * | 10/2003 | Stricklin .............. G08G 1/0175 340/933 |

(Continued)

*Primary Examiner* — Xiao M Wu
*Assistant Examiner* — Scott E Sonners
(74) *Attorney, Agent, or Firm* — Levine Bagade Han LLP

(57) ABSTRACT

Disclosed herein are methods and systems that allow users to report traffic violations and obtain information concerning reported violations using mobile devices. In one embodiment, a method comprises receiving, at a server, one or more images or videos captured by a mobile device of an offending vehicle committing a potential traffic violation and an extended metadata tag; storing the one or more images or videos and the extended metadata tag as unstructured content in a content lake; generating database tables on top of the content lake; receiving a request from another mobile device to view traffic violation content; querying the database tables and retrieving at least one of the one or more images or videos of the offending vehicle committing the potential traffic violation from the content lake; and generating a GUI to be displayed via the other mobile device showing the traffic violation content.

20 Claims, 13 Drawing Sheets

(51) Int. Cl.
*G06V 10/75* (2022.01)
*G06V 20/40* (2022.01)
*G06V 20/56* (2022.01)
*G06F 16/44* (2019.01)
*G06V 20/62* (2022.01)
*G06F 16/432* (2019.01)

(52) U.S. Cl.
CPC ............ *G06V 10/757* (2022.01); *G06V 20/46* (2022.01); *G06V 20/56* (2022.01); *G06F 16/447* (2019.01); *G06T 2207/30252* (2013.01); *G06V 20/44* (2022.01); *G06V 20/625* (2022.01); *G06V 2201/07* (2022.01); *G06V 2201/08* (2022.01)

(58) Field of Classification Search
CPC ........... G06T 2207/20084; G06T 7/292; G06T 2207/30232; G06T 7/74; G06T 19/006; G06T 7/97; G06T 19/00; G06T 7/11
See application file for complete search history.

(56) References Cited

U.S. PATENT DOCUMENTS

| | | | |
|---|---|---|---|
| 2005/0122235 A1* | 6/2005 | Tetter | G08G 1/08 348/148 |
| 2013/0141253 A1* | 6/2013 | Sirota | G08G 1/054 340/936 |
| 2014/0334684 A1* | 11/2014 | Strimling | G07C 9/28 382/104 |
| 2016/0042767 A1* | 2/2016 | Araya | G11B 27/34 386/201 |
| 2019/0174109 A1* | 6/2019 | Yoshikawa | H04N 13/279 |
| 2021/0110713 A1* | 4/2021 | Silva | G08G 1/0112 |
| 2021/0248289 A1* | 8/2021 | Fasano | G06Q 10/04 |

* cited by examiner

CARRIER VEHICLE 110
MUNICIPAL FLEET VEHICLE
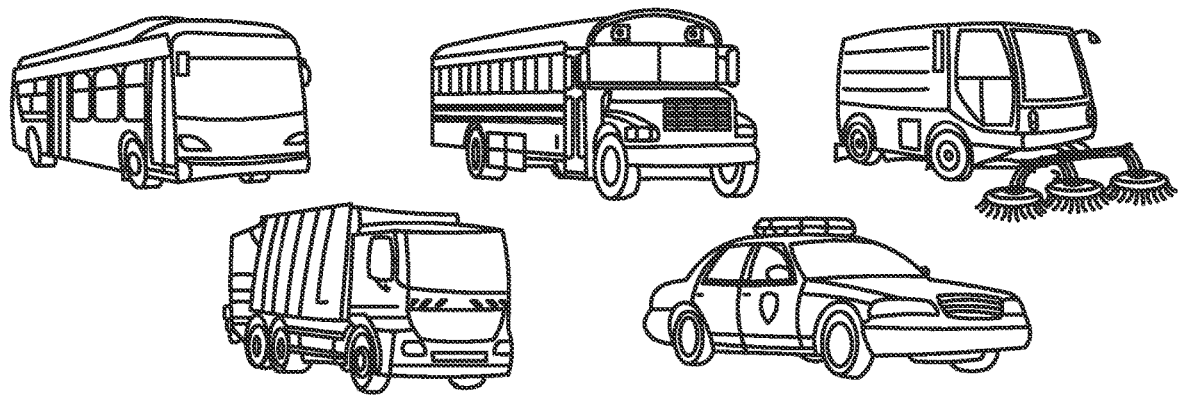
SEMI-AUTONOMOUS VEHICLE
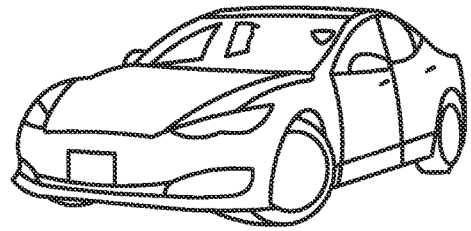
AUTONOMOUS VEHICLE
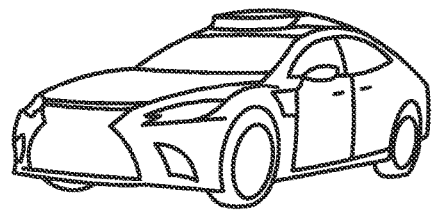
FIG. 4

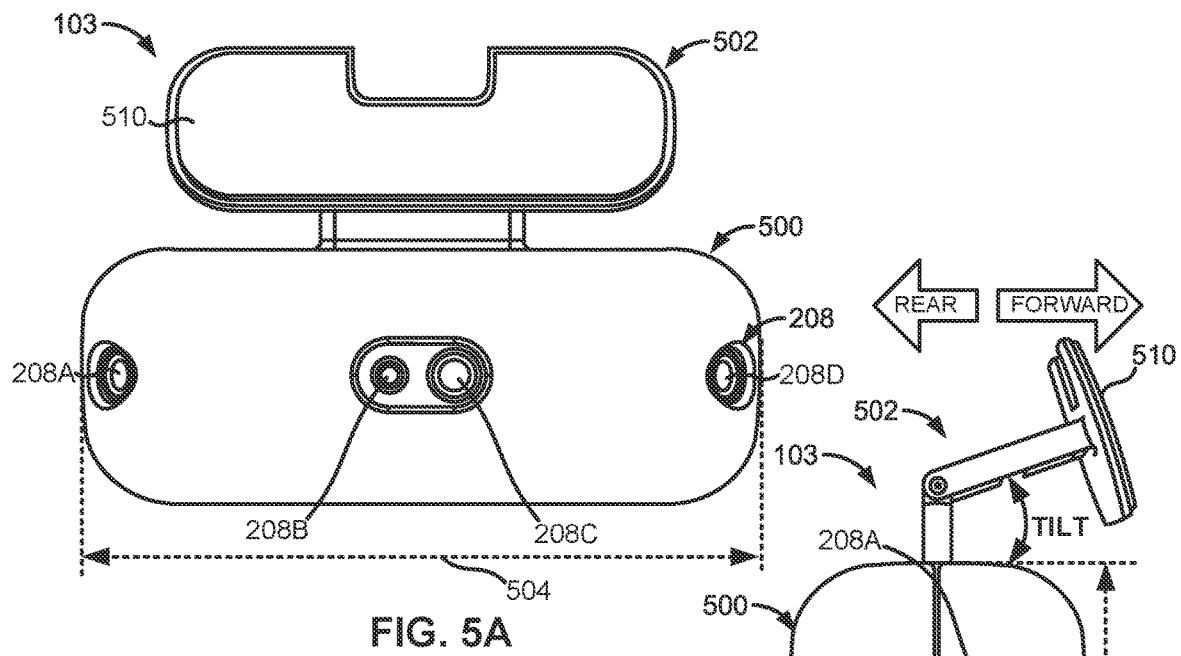
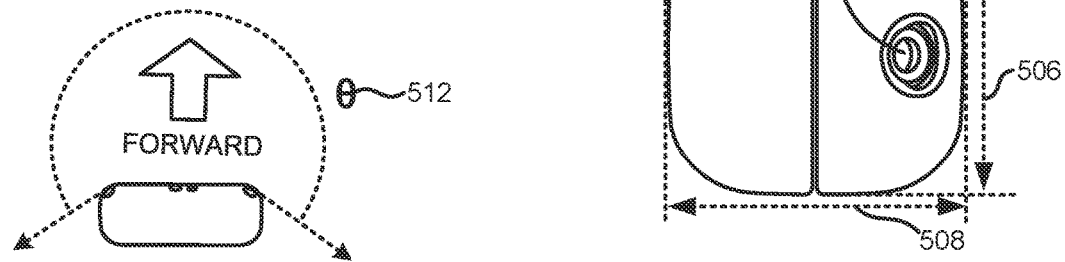
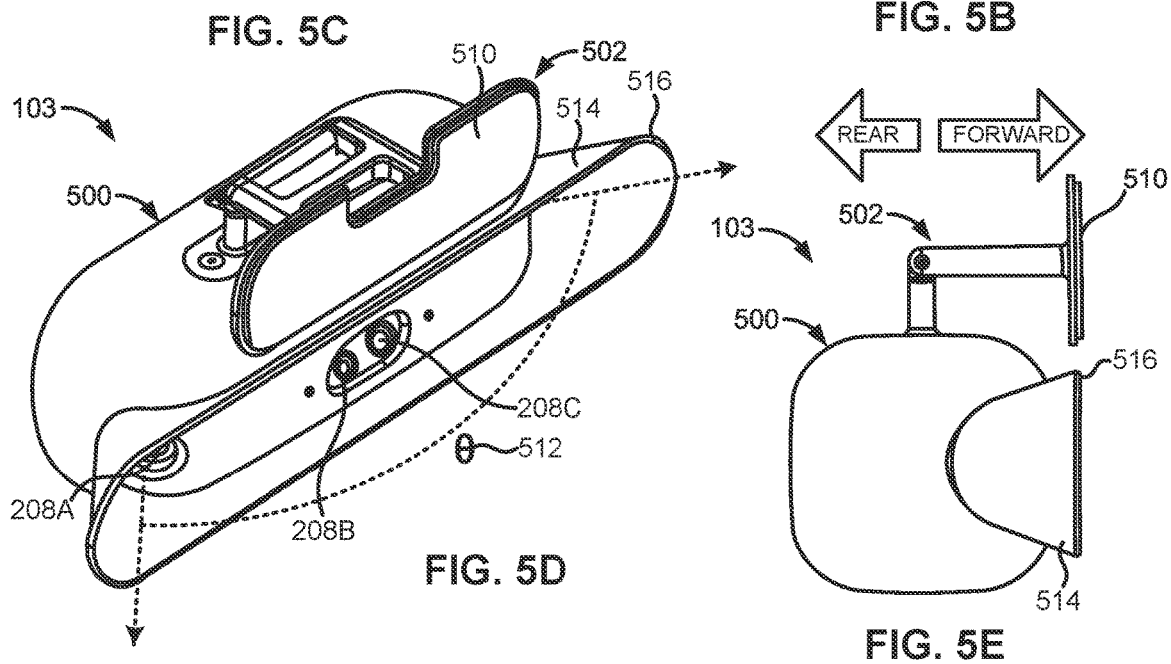

SYSTEMS AND METHODS FOR USER REPORTING OF TRAFFIC VIOLATIONS USING A MOBILE APPLICATION

CROSS-REFERENCE TO RELATED APPLICATION

This application claims the benefit of U.S. Provisional Patent Application No. 63/175,789 filed on Apr. 16, 2021, the content of which is incorporated herein by reference in its entirety.

TECHNICAL FIELD

This disclosure relates generally to the field of traffic violation reporting and more specifically, to systems and methods for user reporting of traffic violations using a mobile application.

BACKGROUND

Non-public vehicles parking in bus lanes or bike lanes is a significant transportation problem for municipalities, counties, and other government entities. While some cities have put in place Clear Lane Initiatives aimed at improving bus speeds, enforcement of bus lane violations is often lacking and the reliability of multiple buses can be affected by just one vehicle illegally parked or temporarily stopped in a bus lane. Such disruptions in bus schedules can frustrate those that depend on public transportation and result in decreased ridership. On the contrary, as buses speed up due to bus lanes remaining unobstructed, reliability improves, leading to increased ridership, less congestion on city streets, and less pollution overall.

Similarly, vehicles parked illegally in bike lanes can force bicyclists to ride on the road, making their rides more dangerous and discouraging the use of bicycles as a safe and reliable mode of transportation. Moreover, vehicles parked along curbs or lanes designated as no parking zones or during times when parking is forbidden can disrupt crucial municipal services such as street sweeping, waste collection, and firefighting operations.

Traditional traffic enforcement technology and approaches are often unsuited for today's fast-paced environment. For example, most traffic enforcement cameras are set up near crosswalks or intersections and are not capable of enforcing or managing lane violations or other types of traffic violations committed beyond the cameras' fixed field of view. While some municipalities have deployed automated camera-based solutions to enforce or manage traffic violations beyond intersections and cross-walks, such solutions are often logic-based and can result in detections with up to an eighty-percent false positive detection rate. Moreover, municipalities often do not have the financial means to dedicate specialized personnel to enforce or manage lane violations or other types of traffic violations.

One solution to the aforementioned problems is to allow residents of a municipality or other individuals to submit evidence of potential traffic violations in the form of images, videos, or other user-generated content through a mobile application run on a smartphone or other portable computing device. However, one technical drawback to this approach is that such user-generated content can quickly overwhelm a traditional database and cause data storage costs to balloon when traditional database management systems are deployed to ingest such user-generated content. This is especially problematic when a substantial portion of user-generated content is likely unusable or not of evidentiary value for purposes of traffic violation detection.

Therefore, improved systems and methods are needed for enabling traffic violation reporting using user-generated content or data. Such solutions should address the problem of how to ingest and manage large amounts of user-generated content or data and how to effectively extract valuable information from such user-generated content or data. Moreover, such a solution should hopefully improve traffic safety and enable transportation efficiency. Furthermore, such a solution should be scalable and reliable and not be overly expensive to deploy.

SUMMARY

Disclosed herein are methods and systems that allow users to report traffic violations and obtain information concerning reported violations using mobile devices. In one embodiment, a method of providing traffic violation information comprises receiving, at a server, one or more images or videos captured by a mobile device of an offending vehicle committing a potential traffic violation and an extended metadata tag associated with the one or more images or videos, wherein the mobile device is communicatively coupled to the server; storing the one or more images or videos and the extended metadata tag as unstructured content in a content lake accessible to the server; generating or updating, using one or more processors of the server, a plurality of database tables in a database layer on top of the content lake based in part on the extended metadata tag when at least one of a temporal threshold and a submission threshold is met; receiving a request from another mobile device to view traffic violation content based on at least one of a geographical area parameter and a temporal parameter; querying the database tables using at least one of the geographical area parameter and the temporal parameter and retrieving at least one of the one or more images or videos of the offending vehicle committing the potential traffic violation from the content lake; and generating a graphical user interface (GUI) to be displayed via the other mobile device showing the traffic violation content, wherein the traffic violation content includes at least one of the one or more images or videos of the offending vehicle committing the potential traffic violation.

In some embodiments, the one or more images or videos captured by the mobile device comprises at least a first image or video frame capturing at least part of a front or rear of the offending vehicle, a second image or video frame capturing at least part of a first side of the offending vehicle, and a third image or video frame capturing at least part of a second side of the offending vehicle. In these and other embodiments, the method further comprises performing multi-view co-registration on the first image, the second image, and the third image by: identifying key points from the first image, the second image, and the third image, matching at least some of the key points from the first image and the second image, and matching at least some of the key points from the first image and the third image; and generating a virtual three-dimensional (3D) model of the offending vehicle within at least part of a restricted area by applying photogrammetry tools to at least the first image, the second image, and the third image.

In other embodiments, the one or more images or videos captured by the mobile device comprises at least a first image or video frame capturing at least part of a front or rear of the offending vehicle and a second image or video frame capturing at least part of a first side of the offending vehicle.

In these embodiments, the method further comprises receiving, at the server, a third image or video frame captured by another mobile device or a perception device communicatively coupled to the server of the same offending vehicle committing the same potential traffic violation, wherein the third image or video frame captures at least part of a second side of the offending vehicle; performing multi-view co-registration on the first image, the second image, and the third image by: identifying key points from the first image, the second image, and the third image, matching at least some of the key points from the first image and the second image, and matching at least some of the key points from the first image and the third image; and generating a virtual three-dimensional (3D) model of the offending vehicle within at least part of a restricted area by applying photogrammetry tools to at least the first image, the second image, and the third image.

In some embodiments, the request received from the other mobile device is a content feed request to subscribe to a content feed and wherein the GUI includes a scrollable content feed displaying the one or more images or videos of the offending vehicle and data concerning the potential traffic violation from the content lake. The content feed is configured to automatically update and the other mobile device is configured to receive a notification when the content feed is automatically updated.

In some embodiments, the method further comprises incrementing a reward balance of a reward account associated with a user of the mobile device in response to receiving the one or more images or videos from the mobile device.

In some embodiments, the method further comprises applying an obfuscating filter or a blurring filter of a preconfigured blur filter level to an object automatically detected in the one or more images or videos, and wherein the traffic violation content includes at least one of the one or more images or videos with the object blurred using the obfuscating filter or blurring filter.

In some embodiments, the method further comprises generating a digital twin of a municipality using, in part, objects detected from the one or more images or videos captured by the mobile device. In certain embodiments, the digital twin is implemented as a time-series database.

In some embodiments, the method further comprises receiving, at the server, information concerning a violation type from the mobile device concerning the potential traffic violation, wherein the violation type is selected in response to a user input applied to a violation selection GUI displayed via the mobile device.

In some embodiments, the method further comprises receiving, at the server, additional images or videos captured by a perception device using one or more video image sensors of the perception device, wherein the additional images or videos are stored in the content lake, wherein the perception device is coupled to a carrier vehicle, and wherein the additional images or videos are captured by the one or more video image sensors of the perception device while the carrier vehicle is in motion.

Also disclosed is a system for providing traffic violation information comprising a server communicatively coupled to a plurality of mobile devices, wherein the server includes one or more server processors programmed to: receive one or more images or videos of an offending vehicle committing a potential traffic violation and an extended metadata tag associated with the one or more images or videos, wherein the one or more images or videos are captured by one of the mobile devices; store the one or more images or videos and the extended metadata tag as unstructured content in a content lake accessible to the server; generate or update a plurality of database tables in a database layer on top of the content lake based in part on the extended metadata tag when at least one of a temporal threshold and a submission threshold is met; receiving a request from another one of the mobile devices to view traffic violation content based on at least one of a geographical area parameter and a temporal parameter; query the database tables using at least one of the geographical area parameter and the temporal parameter and retrieve at least one of the one or more images or videos of the offending vehicle committing the potential traffic violation from the content lake; and generate a graphical user interface (GUI) to be displayed via the other one of the mobile devices showing the traffic violation content, wherein the traffic violation content includes the one or more images or videos of the offending vehicle committing the potential traffic violation.

In some embodiments, the one or more images or videos captured by the mobile device comprises at least a first image or video frame capturing at least part of a front or rear of the offending vehicle, a second image or video frame capturing at least part of a first side of the offending vehicle, and a third image or video frame capturing at least part of a second side of the offending vehicle. In these and other embodiments, the one or more server processors are further programmed to: perform multi-view co-registration on the first image, the second image, and the third image by: identifying key points from the first image, the second image, and the third image, matching at least some of the key points from the first image and the second image, and matching at least some of the key points from the first image and the third image; and generate a virtual three-dimensional (3D) model of the offending vehicle within at least part of a restricted area by applying photogrammetry tools to at least the first image, the second image, and the third image.

In some embodiments, the system further comprises a plurality of perception devices communicatively coupled to the server, wherein each of the perception devices is coupled to a carrier vehicle, wherein the one or more server processors are further programmed to: receive from the perception devices additional images or videos captured by video image sensors of the perception devices; and store the additional images or videos in the content lake, wherein at least some of the images or videos are captured by a perception device while the carrier vehicle is in motion.

In some embodiments, the one or more images or videos captured by the mobile device comprises at least a first image or video frame capturing at least part of a front or rear of the offending vehicle and a second image or video frame capturing at least part of a first side of the offending vehicle. In these and other embodiments, the one or more server processors are further programmed to: receive a third image or video frame captured by another mobile device or one of the perception devices of the same offending vehicle committing the same potential traffic violation, wherein the third image or video frame captures at least part of a second side of the offending vehicle; perform multi-view co-registration on the first image, the second image, and the third image by: identifying key points from the first image, the second image, and the third image, matching at least some of the key points from the first image and the second image, and matching at least some of the key points from the first image and the third image; and generate a virtual three-dimensional (3D) model of the offending vehicle within at least part of a restricted area by applying photogrammetry tools to at least the first image, the second image, and the third image.

In some embodiments, the one or more server processors are further programmed to apply an obfuscating filter or a blurring filter of a preconfigured filter level to an object automatically detected in the one or more images or videos, and wherein the traffic violation content includes at least one of the one or more images or videos with the object blurred/obfuscated using the obfuscating filter or blurring filter.

In some embodiments, the one or more server processors are further programmed to generate a digital twin of a municipality using, in part, objects detected from the one or more images or videos captured by the mobile device. In certain embodiments, the digital twin is implemented as a time-series database.

Also disclosed is a non-transitory computer-readable medium including machine-executable instructions stored thereon, wherein the instructions comprise the steps of: receiving, at a server, one or more images or videos captured by a mobile device of an offending vehicle committing a potential traffic violation and an extended metadata tag associated with the one or more images or videos, wherein the mobile device is communicatively coupled to the server; storing the one or more images or videos and the extended metadata tag as unstructured content in a content lake accessible to the server; generating or updating a plurality of database tables in a database layer on top of the content lake based in part on the extended metadata tag when at least one of a temporal threshold and a submission threshold is met; receiving a request from another mobile device to view traffic violation content based on at least one of a geographical area parameter and a temporal parameter; querying the database tables using at least one of the geographical area parameter and the temporal parameter and retrieving at least one of the one or more images or videos of the offending vehicle committing the potential traffic violation from the content lake; and generating a graphical user interface (GUI) to be displayed via the other mobile device showing the traffic violation content, wherein the traffic violation content includes the one or more images or videos of the offending vehicle committing the potential traffic violation.

In some embodiments, the one or more images or videos captured by the mobile device comprises at least a first image or video frame capturing at least part of a front or rear of the offending vehicle, a second image or video frame capturing at least part of a first side of the offending vehicle, and a third image or video frame capturing at least part of a second side of the offending vehicle. In these and other embodiments, the instructions further comprise the steps of: performing multi-view co-registration on the first image, the second image, and the third image by: identifying key points from the first image, the second image, and the third image, matching at least some of the key points from the first image and the second image, and matching at least some of the key points from the first image and the third image; and generating a virtual three-dimensional (3D) model of the offending vehicle within at least part of a restricted area by applying photogrammetry tools to at least the first image, the second image, and the third image.

In some embodiments, the instructions further comprise the step of generating a digital twin of a municipality using, in part, objects detected from the one or more images or videos captured by the mobile device.

In some embodiments, the extended metadata tag comprises a location of the mobile device when the mobile device captured the one or more images or videos, a time recorded by the mobile device when the mobile device captured the one or more images or videos, a vehicle type of the offending vehicle automatically detected by an object-detection deep learning model running on the mobile device, and a license plate number of the offending device automatically detected by a license-plate recognition deep learning model running on the mobile device. In certain embodiments, at least one metadata tag of the extended metadata tag is a prediction outputted by a deep learning model configured to conduct automatic object detection or recognition on the one or more images or videos.

In some embodiments, the extended metadata tag is stored along with previously-stored extended metadata tags in the content lake, and wherein the extended metadata tag and the previously-stored extended metadata tags are parsed by the server in order to generate the plurality of database tables.

In some embodiments, the plurality of database tables comprise database tables organized by a location of the potential traffic violation, a time of the potential traffic violation, a violation type, a submitting user, and a submitting device.

In some embodiments, the plurality of database tables are generated or updated when an elapsed time meets the temporal threshold or a number of traffic violations reported meets the submission threshold.

BRIEF DESCRIPTION OF THE DRAWINGS

FIG. 4 illustrates different examples of carrier vehicles used to carry the perception device.

FIG. 5A illustrates a front view of one embodiment of the perception device.

FIG. 5B illustrates a right side view of the embodiment of the perception device shown in FIG. 5A.

FIG. 5C illustrates a combined field of view of cameras housed within the embodiment of the perception device shown in FIG. 5A.

FIG. 5D illustrates a perspective view of another embodiment of the perception device having a camera skirt.

FIG. 5E illustrates a right side view of the embodiment of the perception device shown in FIG. 5D.

DETAILED DESCRIPTION

Figure 1A:
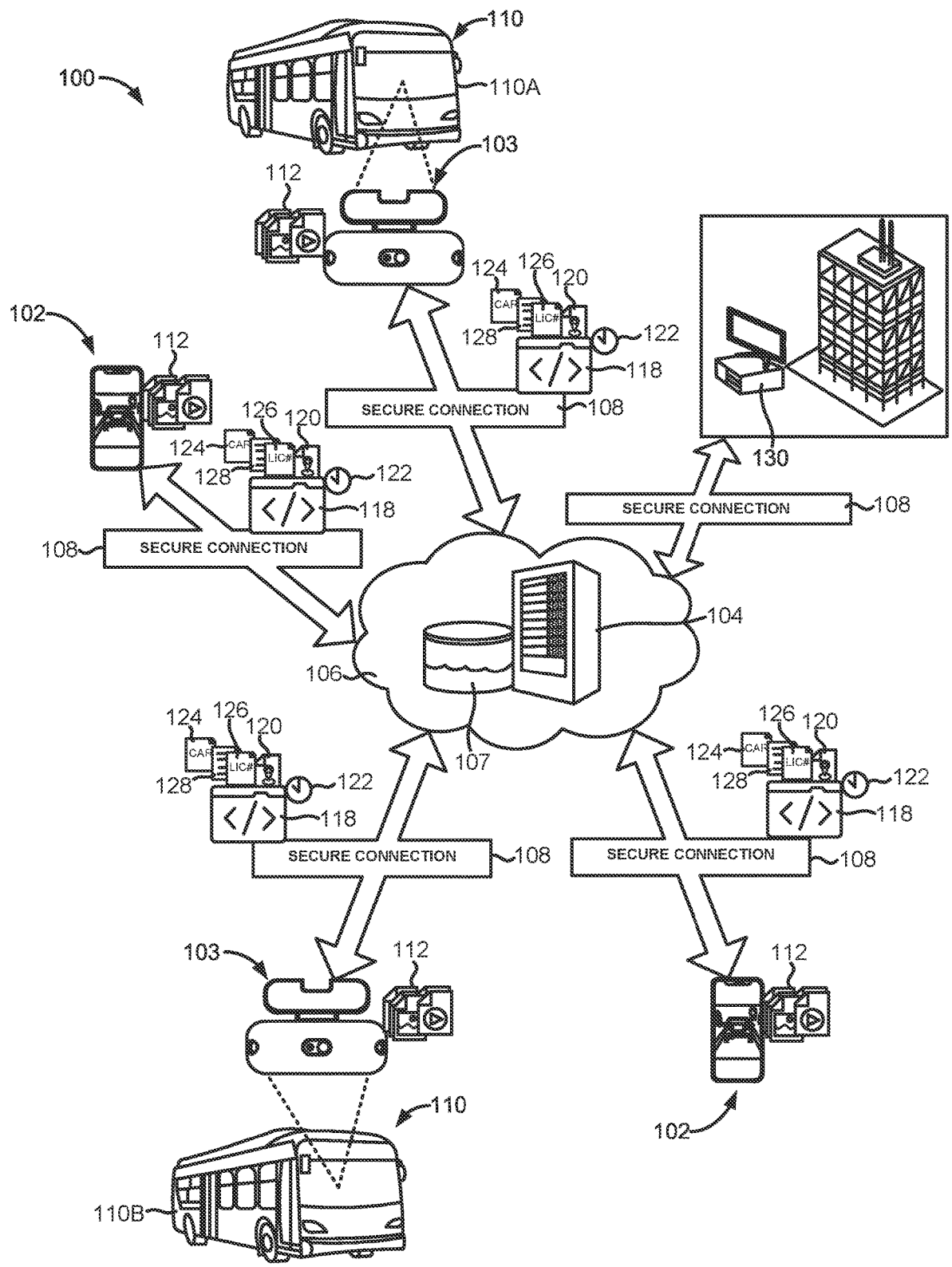
FIG. 1A illustrates one embodiment of a system for user reporting of traffic violations.

FIG. 1A illustrates one embodiment of a system 100 allowing users to report traffic violations. The system 100 can allow users to obtain traffic violation information aggregated from other users who have previously reported traffic violations. The system 100 can comprise a plurality of mobile devices 102 and vehicle-mounted perception devices 103 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The mobile devices 102 and the perception devices 103 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of mobile devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The mobile devices 102 and the perception devices 103 can transmit data and files over-the-air to the server 104 and receive data and files over-the-air from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

As will be discussed in more detail in later sections, the server 104 can store data and files received from the mobile devices 102 and the perception devices 103 as unstructured content or data in a content lake 107 in the cloud computing environment 106. In some embodiments, the data and files stored in the content lake 107 can be distributed among numerous cloud-based storage nodes.

The mobile device 102 can refer to a personal communication device such as a smartphone carried by a user of the system 100. In other embodiments, the mobile device 102 can be another type of personal communication device or personal computing device such as a tablet computer, a laptop computer, or a pair of smart eyeglasses or sunglasses that can record videos or images and communicate with the server 104.

A user carrying the personal communication device (e.g., a smartphone) can capture one or more images or videos 112 of an offending vehicle 114 committing a potential traffic violation using a mobile application 300 (see, e.g., FIG. 3) running on the personal communication device 103. The one or more images or videos 112 can show at least part of the offending vehicle 114 within a restricted area 116 (e.g., a bus lane, a bike lane, a no stopping zone, a handicap parking space, etc.). Once the mobile device 102 has successfully captured one or more images or videos of the offending vehicle 114 committing the potential traffic violation, the mobile device 102 can then process and analyze the images or video frames from the videos using certain computer vision tools from a computer vision library and one or more deep learning models running on the mobile device 102. In some embodiments, the user can also input certain information concerning the potential traffic violation via the mobile application 300.

The mobile device 102 can then transmit the one or more images or videos 112 to the server 104 along with an extended metadata tag 118 generated by the mobile device 102 to be stored as unstructured content in the content lake 107. In some embodiments, the videos captured can be in the MPEG-4 Part 12 or MP4 file format. In these and other embodiments, the images captured can be in the PNG, JPEG, TIFF, or HEIF/HEIC format.

The extended metadata tag 118 can provide data or information concerning the image(s) or video(s) 112 captured by the mobile device 102 including certain content within the image(s) or video(s) 112. The extended metadata tag 118 can be generated by the mobile device 102 once the mobile device 102 has captured the one or more images or videos of the offending vehicle 114. The extended metadata tag 118 can be generated based on instructions executed as part of the mobile application 300.

In some embodiments, the extended metadata tag 118 can comprise data or information concerning a location 120 and time 122 of the potential traffic violation (or an approximation of the location 120 and time 122). The extended metadata tag 118 can also comprise a number of metadata tags generated using predictions outputted by one or more deep learning models configured to conduct automatic object detection or recognition on the image(s) or video(s) 112 captured by the mobile device 102. For example, the extended metadata tag 118 can comprise metadata tags concerning a vehicle type 124 of the offending vehicle 114 and a license plate number 126 of the offending vehicle 114.

In some embodiments, the vehicle type 124 of the offending vehicle 114 can be automatically detected by an object-detection deep learning model (e.g., an object-detection convolutional neural network) running on the mobile device 102 and the license plate number 126 of the offending vehicle 114 can be automatically detected by a license-plate recognition deep learning model running on the mobile device 102.

In these and other embodiments, the extended metadata tag 118 can also comprise a metadata tag concerning a violation type 128 (e.g., a bus-lane violation, no-parking zone violation, a handicapped parking violation, etc.). In some embodiments, the violation type 128 can be automatically detected based on one or more objects or signs detected within a vicinity of the offending vehicle 114. In other embodiments, the violation type 128 can be selected in response to a user applying a user input to a violation selection GUI 606 (see FIG. 6B) displayed via the mobile application 300.

As will be discussed in more detail in the following sections, each of the perception devices 103 can be carried by or installed in a carrier vehicle 110 (see FIG. 4 for examples of different types of carrier vehicles 110). The perception device 103 can capture images or videos 112 of an external environment while the carrier vehicle 110 carrying the perception device 103 is either driving or stopped.

For example, the perception device 103 can be secured or otherwise coupled to a windshield, window, or dashboard/ deck of the carrier vehicle 110. Also, for example, the perception device 103 can be secured or otherwise coupled to a handlebar/handrail of a micro-mobility vehicle serving as the carrier vehicle 110. Alternatively, the perception device 103 can be secured or otherwise coupled to a mount or body of a UAV or drone serving as the carrier vehicle 110.

When properly coupled or secured to the windshield, window, or dashboard/deck of the carrier vehicle 110 or secured to a handrail, handlebar, or mount/body of the carrier vehicle 110, the perception device 103 can use its video image sensors 208 (see, e.g., FIG. 5A-5E) to capture images or videos 112 of an external environment within a field view of the video image sensors 208. Each of the perception devices 103 can be configured to continuously take images or videos 112 of its surrounding environment (i.e., an environment outside of the carrier vehicle 110) as the carrier vehicle 110 traverses its carrier route 132 (see FIG. 1B). The perception device 103 can capture the images or videos 112 while the carrier vehicle 110 (e.g., a city bus) carrying the perception device 103 is in motion (e.g., driving along its bus route).

In other embodiments, the perception device 103 can capture the images or videos 112 while the carrier vehicle 110 carrying the perception device 103 is stopped or parked. For example, the perception device 103 can capture the images or videos 112 while the carrier vehicle 110 carrying the perception device 103 is stopped in traffic or hindered from moving due to a vehicle committing a traffic violation (for example, if the carrier vehicle 110 is a city bus and the vehicle is parked or otherwise stopped in a bus lane designated for city buses).

Each of the perception devices 103 can then process and analyze images or video frames from such videos 112 using certain computer vision tools from a computer vision library and a plurality of deep learning models to detect whether a traffic violation has occurred. If the perception device 103 determines that a potential traffic violation has occurred, the perception device 103 can transmit at least some of the images or a portion of the videos 112 along with an extended metadata tag 118 associated with the images or videos 112 to the server 104 to be stored as unstructured content in the content lake 107.

For example, the perception device 103 can capture images or videos 112 of the offending vehicle 114 and at least part of the restricted area 116 using one or more video image sensors 208 (see, e.g., FIGS. 5A-5E) of the perception device 103. In one embodiment, the videos 112 can be videos in the MPEG-4 Part 12 or MP4 file format.

The extended metadata tag 118 can provide data or information concerning the images or videos 112 captured by the perception device 103 involving a potential traffic violation. The extended metadata tag 118 can be generated by the perception device 103 once the perception device 103 has determined that a potential traffic violation has occurred.

In some embodiments, the extended metadata tag 118 can comprise data or information concerning a location 120 and time 122 recorded by the perception device 103 when the perception device 103 captured the one or more videos 112. The location 120 of the perception device 103 can be used as an approximate location of the potential traffic violation and the time 122 recorded by the perception device 103 when the perception device 103 captured the one or more videos 112 can be used as an approximate time of the potential traffic violation.

The extended metadata tag 118 can also comprise a number of metadata tags generated using predictions outputted by one or more deep learning models configured to conduct automatic object detection or recognition on the images or videos 112 captured by the perception device 103. For example, the extended metadata tag 118 can comprise metadata tags concerning a vehicle type 124 of the offending vehicle 114 and a license plate number 126 of the offending vehicle 114.

At least one of the video image sensors 208 of the perception device 103 can be a dedicated license plate recognition (LPR) camera. For example, the images or videos 112 captured by the perception device 103 can comprise at least one image or video frame showing a license plate of the offending vehicle 114. The perception device 103 can pass the video frame captured by the LPR camera to a license plate recognition engine 316 running on the perception device 103 (see, e.g., FIG. 3) to recognize an alphanumeric string representing the license plate number 126 of the offending vehicle 114.

In other embodiments not shown in the figures, the license plate recognition engine 316 can be run on the server 104. In further embodiments, the license plate recognition engine 316 can be run on the perception device 103 and the server 104.

Alternatively, the perception device 103 can pass a video frame captured by one of the other video image sensors 208 (e.g., one of the HDR cameras) to the license plate recognition engine 316 run on the perception device 103, the server 104, or a combination thereof.

The extended metadata tag 118 can also comprise a metadata tag concerning a violation type 128 (e.g., a bus-lane violation, no-parking zone violation, a handicapped parking violation, etc.). In some embodiments, the violation type 128 can be automatically detected by the perception device 103 based on one or more objects or signs detected within a vicinity of the offending vehicle 114.

FIG. 1A also illustrates that the server 104 can transmit certain data and files to a third-party computing device 130. For example, the third-party computing device 130 can be a server or computing resource of a third-party traffic violation processor. As a more specific example, the third-party computing device 130 can be a server or computing resource of a government vehicle registration department. In other examples, the third-party computing device can be a server or computing resource of a sub-contractor responsible for processing traffic violations for a municipality or other government entity. The computing device 130 can be distinguished from the mobile device 102 in that the computing device 130 is only used by a user to view certain content or maps generated by the server 104 but is not used to report potential traffic violations.

Figure 1B:
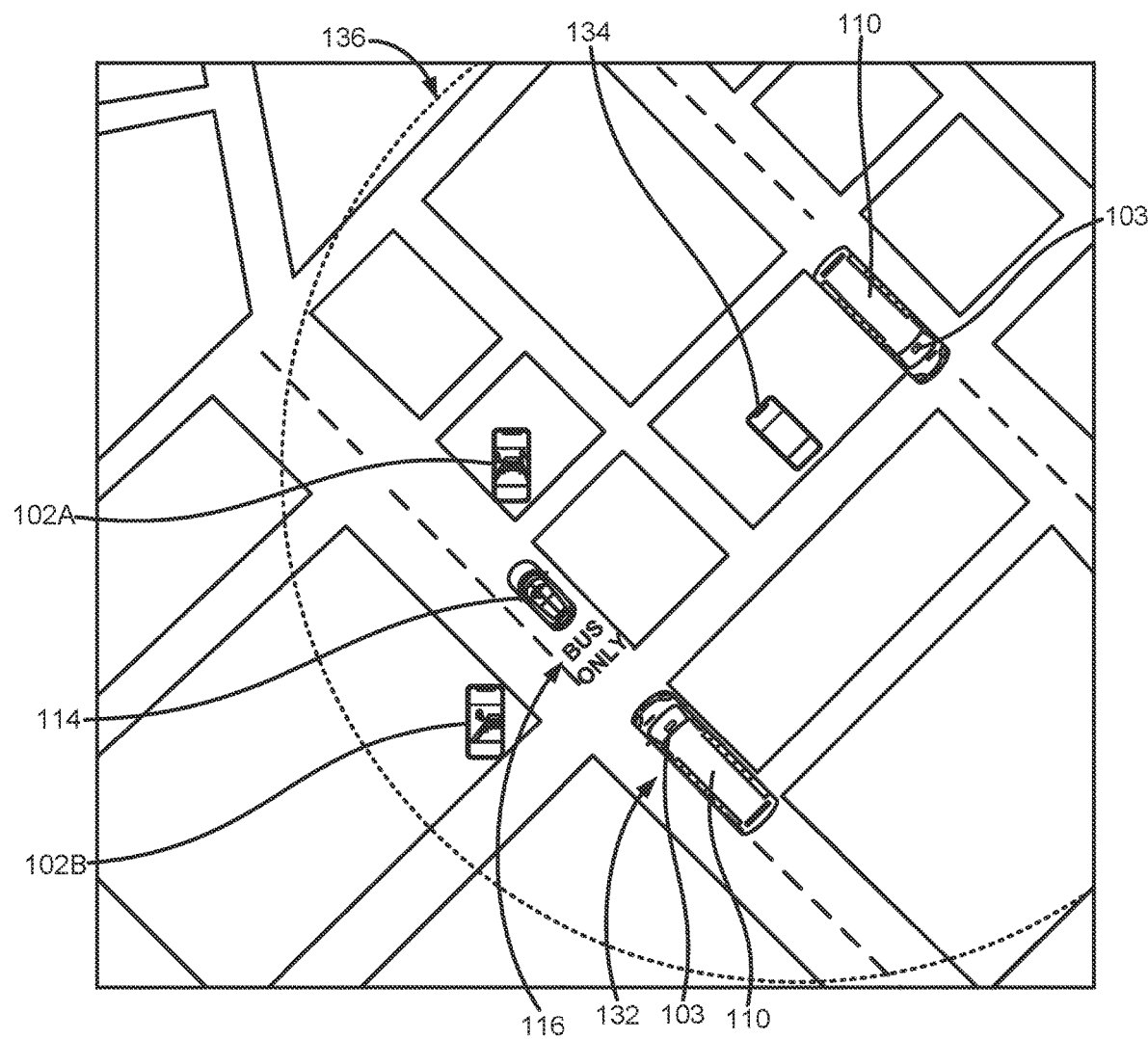
FIG. 1B illustrates a scenario where the system of FIG. 1A can be utilized by a user to report a traffic violation.

FIG. 1B illustrates a scenario where the system 100 of FIG. 1A can be utilized to allow users to report a traffic violation and to provide information concerning the potential traffic violation to other users. As shown in FIG. 1B, an offending vehicle 114 can be driving, parked, or otherwise stopped in a restricted area 116 (e.g., a bus lane). In other embodiments not shown in the FIG. 1B, the restricted area 116 can be a bike lane, a no parking or no stopping zone (e.g., a no-parking zone in front of a red curb or fire hydrant), a pedestrian crosswalk, or a restricted parking spot (e.g., a handicap parking spot) where the offending vehicle 114 does not have the necessary credentials or authorizations to park in the parking spot. The restricted area 116 can be marked by certain insignia, text, signage, road or curb coloration, or a combination thereof. In other embodiments, the restricted area 116 can be designated or indicated in a private or public database (e.g., a municipal GIS database) accessible by the mobile devices 102, the perception devices 103, the server 104, or a combination thereof.

A first user (not shown) carrying a first mobile device 102A having an instance of the mobile application 300 running on the first mobile device 102A can capture one or more images or videos 112 of the offending vehicle 114 committing a traffic violation by being within the restricted area 116. In some embodiments, the first user can capture the one or more images or videos 112 in real-time directly through the mobile application 300. In other embodiments, the first user can upload previously captured images or videos 112 through the mobile application 300.

The first user can use the first mobile device 102A to capture images or videos 112 of the offending vehicle 114 from multiple viewing angles or vantage points so that multiple sides of the offending vehicle 114 are shown in the images or videos 112. As a more specific example, the first user can use the first mobile device 102A to capture images or videos 112 of the offending vehicle 114 from at least three viewing angles such that a front or rear of the offending vehicle 114 is shown along with the two sides of the offending vehicle 114.

Alternatively, the first user can use the first mobile device 102A to capture one or more images or videos 112 of the offending vehicle 114 from a single viewing angle or vantage point. For example, the first user can use the first mobile device 102A to capture one or more images or videos 112 of only one side of the offending vehicle 114 or only the front or rear of the offending vehicle 114.

FIG. 1B also illustrates that a second user (not shown) carrying a second mobile device 102B having another instance of the mobile application 300 running on the second mobile device 102B can also capture one or more images or videos 112 of the same offending vehicle 114 committing the same traffic violation. In some embodiments, the second user can capture the one or more images or videos 112 in real-time directly through the mobile application 300. In other embodiments, the second user can upload previously captured images or videos 112 through the mobile application 300.

In some embodiments, the second mobile device 102B can capture the one or more images or videos 112 of the offending vehicle 114 at a different point in time than the first mobile device 102A. In other embodiments, first mobile device 102A and the second mobile device 102B can capture images or videos 112 of the offending vehicle 114 at points in time that overlap with one another.

The second user can use the second mobile device 102B to capture images or videos 112 of the offending vehicle 114 from multiple viewing angles or vantage points so that multiple sides of the offending vehicle 114 are shown in the images or videos 112. Alternatively, the second user can use the second mobile device 102B to capture one or more images or videos 112 of the offending vehicle 114 from a single viewing angle or vantage point. For example, the second user can use the second mobile device 102B to capture one or more images or videos 112 of only one side of the offending vehicle 114 or only the front or rear of the offending vehicle 114.

In some embodiments, the mobile application 300 can require that a mobile device 102 capture images or videos 112 of an offending vehicle 114 from at least three or four viewing angles before the mobile device 102 transmits the images or videos 112 to the server 104. In these and other embodiments, the mobile application 300 can also require that at least one of the images or videos 112 shows the license plate number of the offending vehicle 114.

The mobile device 102 (e.g., any of the first mobile device 102A or the second mobile device 102B) can automatically generate an extended metadata tag 118 associated with the one or more images or videos 112 captured by the mobile device 102. When the images or videos 112 are captured in real-time using the mobile application 300, the mobile device 102 can generate the extended metadata tag 118 once the images or videos 112 have been captured. When previously captured images or videos 112 are uploaded through the mobile application 300, the mobile device 102 can generate the extended metadata tag 118 once the images or videos 112 have been uploaded.

As previously discussed, the extended metadata tag 118 can comprise tags concerning a location 120 and time 122 logged or recorded by the mobile device 102 as the mobile device 102 is capturing the images or videos 112 of the offending vehicle 114. Moreover, the extended metadata tag 118 can also comprise certain tags generated using predictions outputted by one or more deep learning models configured to conduct automatic object detection or recognition on the images or videos 112 captured by the mobile device 102. For example, one or more processors of the mobile device 102 can pass images or video frames to deep learning models running on the mobile device 102. As a more specific example, the deep learning models can comprise one or more convolutional neural networks trained for object detection and/or license-plate recognition. The extended metadata tag 118 will be discussed in more detail in later sections.

Figure 3:
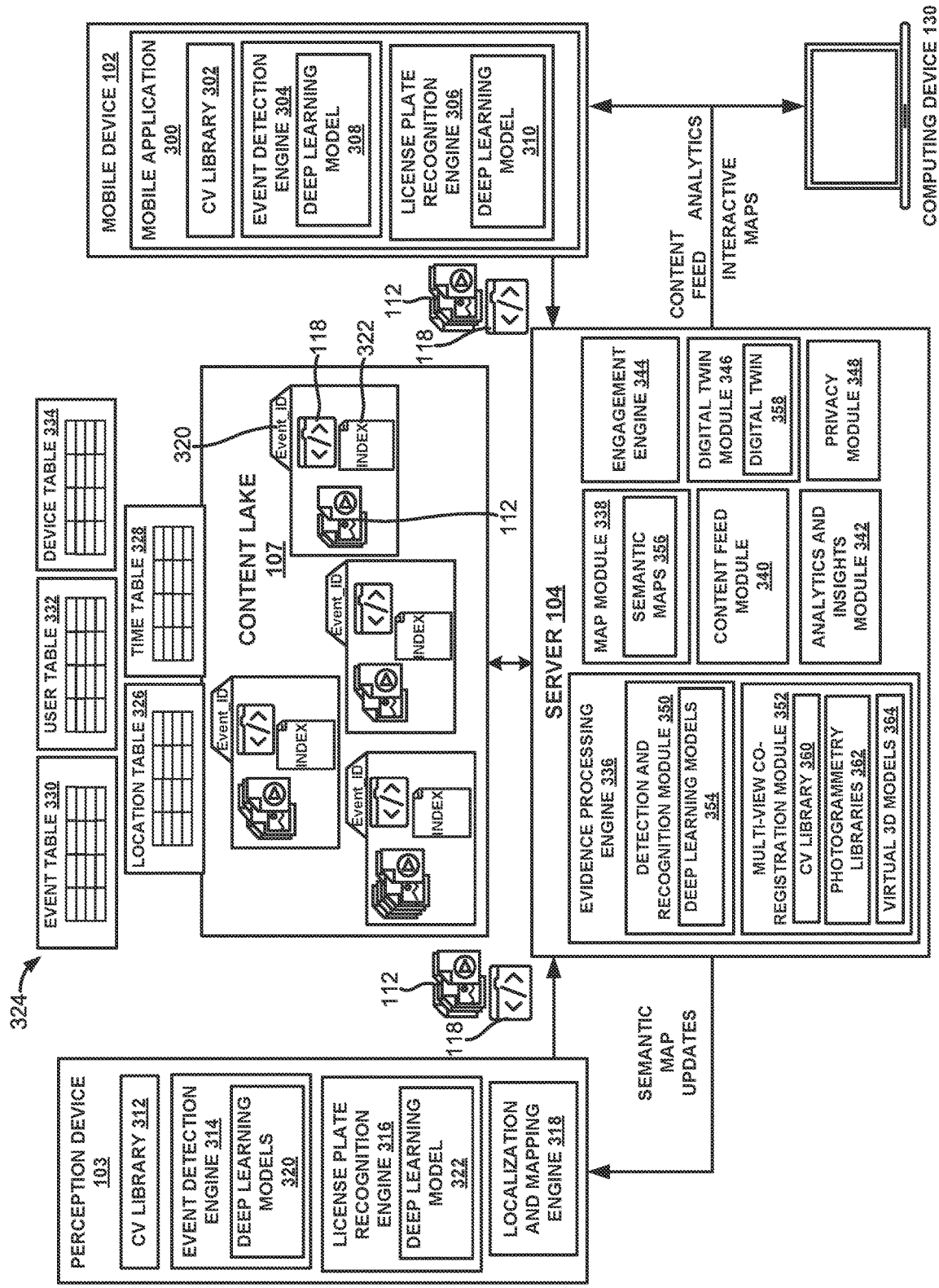
FIG. 3 illustrates various modules and engines of the mobile device, the perception device, and the server.

Each of the mobile devices 102 (e.g., the first mobile device 102A or the second mobile device 102B) can transmit the captured images or videos 112 along with the extended metadata tag 118 to the server 104 for storage as unstructured content in a content lake 107 (see, e.g., FIGS. 1A and 3). The content lake 107 can store the images or vides 112 captured by the mobile devices 102 along with their accompanying extended metadata tags 118.

The content lake 107 can also store images or videos 112 captured by a plurality of vehicle-mounted perception devices 103 and their accompany extended metadata tags 118. For example, FIG. 1B illustrates that carrier vehicles 110 (e.g., municipal fleet vehicles, see also, FIG. 4) having perception devices 103 installed or otherwise mounted in the carrier vehicles 110 can encounter the offending vehicle 114 while traversing their daily carrier routes 132 (e.g., bus route, waste collection route, etc.). The carrier vehicles 110 can encounter the offending vehicle 114 while driving behind or next to the offending vehicle 114 (e.g., in a lane adjacent to the offending vehicle 114). The carrier vehicles 110 can also encounter the offending vehicle 114 while driving in a lane or other roadway blocked by the offending vehicle 114.

As previously discussed, a perception device 103 mounted within a carrier vehicle 110 can be configured to continuously capture images or videos 112 of its surrounding environment (i.e., an environment outside of the carrier vehicle 110). One or more processors within the perception device 103 can be programmed to execute instructions to process and analyze images or video frames from such videos to make an initial determination as to whether a potential traffic violation has occurred. In order to do this, the one or more processors of the perception device 103 can use certain computer vision tools from a computer vision library and a plurality of deep learning models running on the perception device 103.

For example, the one or more processors of the perception device 103 can be programmed to execute instructions to automatically identify the vehicle type 124 of the offending vehicle 114 from the images or video frames by passing the images or video frames to an object-detection deep learning model (e.g., the DetectNet deep neural network) running on the perception device 103. Moreover, the one or more processors can also be programmed to execute instructions to automatically detect the lane or road area occupied by the offending vehicle 114 as a restricted area 116 by passing the images or video frames to a lane detection deep learning model (e.g., the Segnet deep neural network). Automatic lane detection is discussed in more detail in U.S. patent application Ser. No. 17/242,969 filed on Apr. 28, 2021, the contents of which are incorporated herein by reference in its entirety.

The one or more processors of the perception device 103 can then bound the offending vehicle 114 shown in the images or video frames with a vehicle bounding box and bound at least part of the restricted area 116 in a road bounding box or bounding polygon. The one or more processors of the perception device 103 can then make an initial determination that a potential traffic violation has occurred based in part on any overlap between the vehicle bounding box and the road bounding box or bounding polygon. The one or more processors of the perception device 103 can also take into account the location of the offending vehicle 114 based on positioning data obtained from a positioning unit 210 of the perception device 103 and/or wheel odometry data 216 obtained from a wheel odometer of the carrier vehicle 110.

Once the perception device 103 has determined that a potential traffic violation has occurred, the perception device 103 can transmit at least some of the images or a portion of the videos 112 along with an extended metadata tag 118 associated with the images or videos 112 to the server 104 to be stored as unstructured content in the content lake 107. In some embodiments, the perception device 102 can generate an extended metadata tag 118 only for images or videos 112 where a potential traffic violation has been detected.

In other embodiments, the perception device 102 can periodically generate or update extended metadata tags 118 associated with the images or videos 112 captured by the perception device 102 even when a potential traffic violation has not been detected.

The images or videos 112 transmitted by the perception devices 103, including their accompanying extended metadata tags 118, can be stored in the content lake 107 along with the images or videos 112 transmitted by the mobile devices 102, including their accompanying extended metadata tags 118.

The server 104 can generate or update a plurality of database tables 324 (see FIG. 3) based in part on the extended metadata tags 118 stored in the content lake 107 when a temporal threshold (e.g., an elapsed time since the last time the database tables 324 were created or updated), a submission threshold (e.g., a number of submissions received from the mobile devices 102 and/or the perception devices 103), or a combination thereof is met. The plurality of database tables 324 can be created as part of a database layer generated on top of the content lake 107. The extended metadata tags 118 stored within the content lake 107 can be parsed by the server 104 in order to generate the plurality of database tables 324.

Figure 8:
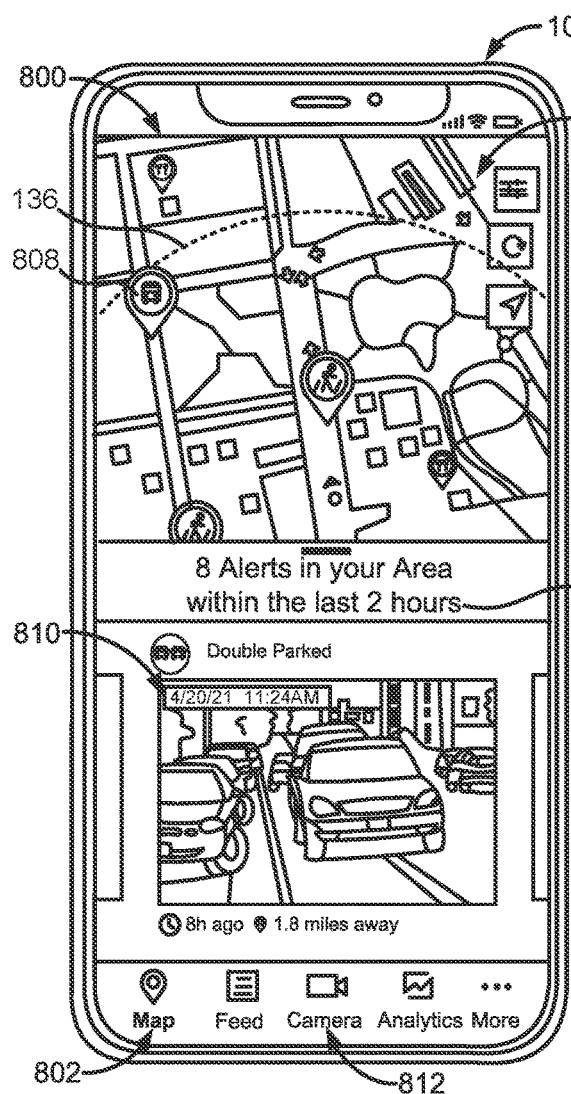
FIG. 8 illustrates one embodiment of a violation map GUI configured to be displayed on a mobile device of a user of the system.

The scenario shown in FIG. 1B can also involve the server 104 receiving a request from another mobile device 134 to view traffic violation content based on at least one of a geographical area parameter 136 and/or a temporal parameter 806 (see, e.g., FIG. 8). For example, the geographical area parameter 136 can be an area surrounding the other mobile device 134 such as an area within a certain radius (e.g., within 100 meters, 1 kilometer, or 5 kilometers, etc.) of the other mobile device 134. The temporal parameter 806 can be a preceding time period such as the last 30 minutes, the last hour, the last 24 hours, or the last 2 weeks.

In response to the server 104 receiving the request from the other mobile device 134, the server 104 can query the database tables 324 using at least one of the geographical area parameter 136 and the temporal parameter 806 and retrieve traffic violation content meeting at least one of the geographical area parameter 136 and the temporal parameter 806. For example, the other mobile device 134 can request data or information concerning traffic violations occurring within one mile of the mobile device 134. If the offending vehicle 114 was located within one mile of the mobile device 134 when the vehicle 114 committed the potential traffic violation, the server 104 can retrieve at least one of the images or videos of the offending vehicle 114 committing the potential traffic violation from the content lake 107.

The server 104 can then generate a graphical user interface (GUI) (see, e.g., FIG. 8 or 9) to be displayed via the other mobile device 134 showing the traffic violation content. For example, the traffic violation content can comprise images or videos 112 of the offending vehicle 114 captured by the first mobile device 102A, the second mobile device 102B, or any of the vehicle-mounted perception devices 103.

The traffic violation content can be presented in the form of an interactive violation map 804 (see, e.g., FIG. 8) or a scrollable content feed 904 (see, e.g., FIG. 9) showing all potential traffic violations that meet at least one of the geographical area parameter 136 and the temporal parameter 806.

Figure 2A:
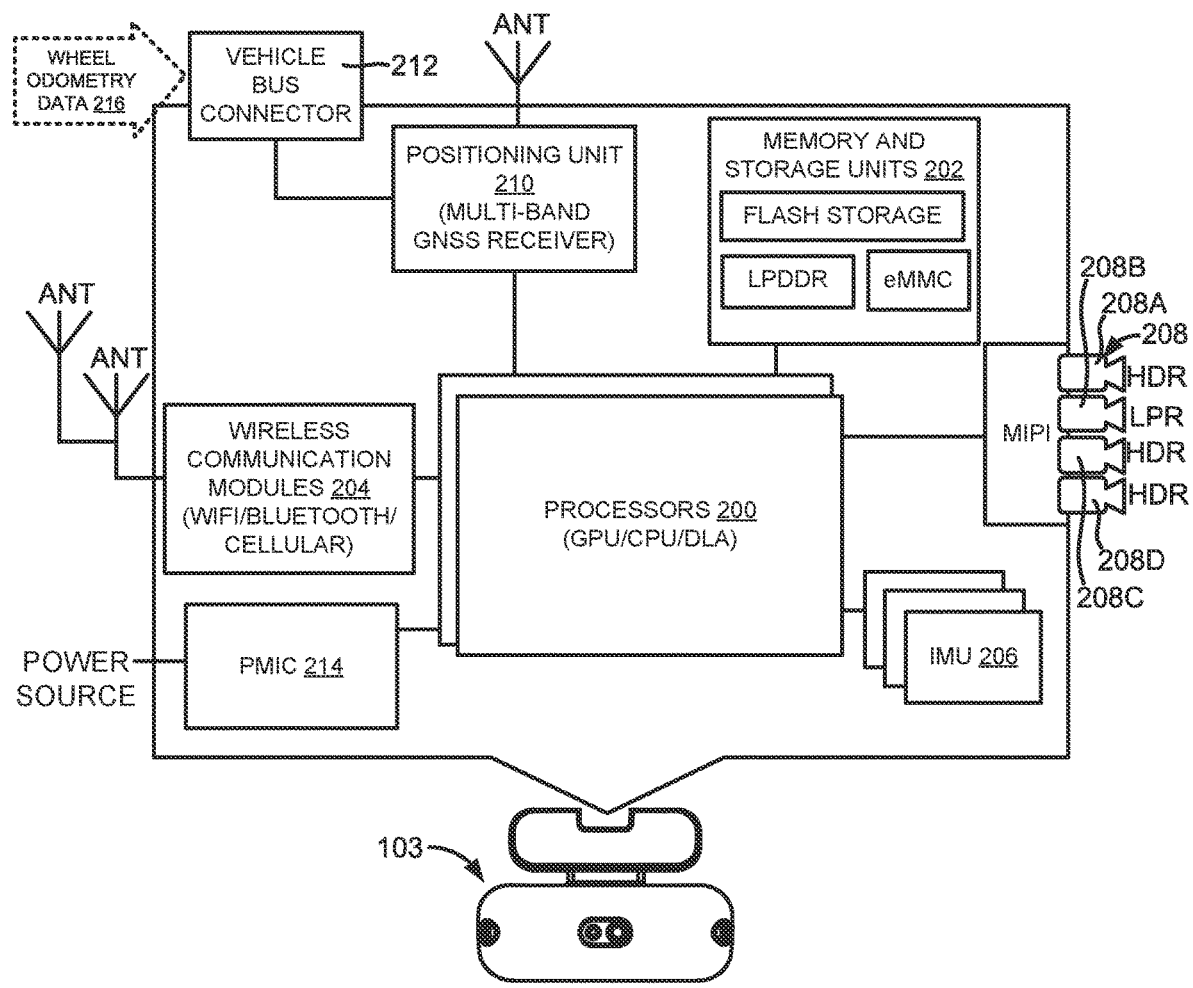
FIG. 2A illustrates one embodiment of a perception device of the system implemented as a vehicle-mountable apparatus configured to be mounted to a carrier vehicle.

FIG. 2A illustrates one embodiment of a perception device 103 of the system 100. For purposes of this disclosure, any references to the perception device 103 can also be interpreted as a reference to a specific component, processor, module, chip, or circuitry within the perception device 103.

As shown in FIG. 2A, the perception device 103 can comprise a plurality of processors 200, memory and storage units 202, wireless communication modules 204, inertial measurement units (IMUs) 206, and video image sensors

208. The perception device 103 can also comprise a positioning unit 210, a vehicle bus connector 212, and a power management integrated circuit (PMIC) 214. The components of the perception device 103 can be connected to one another via high-speed buses or interfaces.

The processors 200 can include one or more central processing units (CPUs), graphical processing units (GPUs), Application-Specific Integrated Circuits (ASICs), field-programmable gate arrays (FPGAs), or a combination thereof. The processors 200 can execute software stored in the memory and storage units 202 to execute the methods or instructions described herein.

For example, the processors 200 can refer to one or more GPUs and CPUs of a processor module configured to perform operations or undertake calculations at a terascale. As a more specific example, the processors 200 of the perception device 103 can be configured to perform operations at 21 tera operations (TOPS). The processors 200 of the perception device 103 can be configured to run multiple deep learning models or neural networks in parallel and process data from multiple high-resolution sensors such as the plurality of video image sensors 208. More specifically, the processor module can be a Jetson Xavier NX™ module developed by NVIDIA Corporation. The processors 200 can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially-designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the perception device 103.

The memory and storage units 202 can comprise volatile memory and non-volatile memory or storage. For example, the memory and storage units 202 can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. For example, the memory and storage units 202 can comprise a 512 gigabyte (GB) SSD, an 8 GB 128-bit LPDDR4× memory, and 16 GB eMMC 5.1 storage device. Although FIG. 2A illustrates the memory and storage units 202 as separate from the processors 200, it should be understood by one of ordinary skill in the art that the memory and storage units 202 can be part of a processor module comprising at least some of the processors 200. The memory and storage units 202 can store software, firmware, data (including video and image data), tables, logs, databases, or a combination thereof.

The wireless communication modules 204 can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the perception device 103 to communicate over a WiFi network such as a WiFi network provided by the carrier vehicle 110, a municipality, a business, or a combination thereof. The WiFi communication module can allow the perception device 103 to communicate over one or more WiFi (IEEE 802.11) commination protocols such as the 802.11n, 802.11ac, or 802.11ax protocol.

The Bluetooth® module can allow the perception device 103 to communicate with other perception devices 103 over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules 204 can comprise a combined WiFi and Bluetooth® module.

Each of the IMUs 206 can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs 206 can be a low-power 6-axis IMU provided by Bosch Sensortec GmbH.

The perception device 103 can comprise one or more video image sensors 208. In one example embodiment, the perception device 103 can comprise a plurality of video image sensors 208. As a more specific example, the perception device 103 can comprise four video image sensors 208 (e.g., a first video image sensor 208A, a second video image sensor 208B, a third video image sensor 208C, and a fourth video image sensor 208D). At least one of the video image sensors 208 can be configured to capture video at a frame rate of between 1 frame per second and 120 frames per second (FPS) (e.g., about 30 FPS). In other embodiments, at least one of the video image sensors 208 can be configured to capture video at a frame rate of between 20 FPS and 80 FPS.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 megapixels (MP)). The LPR camera can also capture video at a frame rate of between 1 frame per second and 120 FPS. In other embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light high-dynamic range (HDR) image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors provided by Sony Semiconductor Solutions Corporation.

The video image sensors 208 can be connected to the processors 200 via a high-speed camera interface such as a Mobile Industry Processor Interface (MIPI) camera serial interface.

In alternative embodiments, the video image sensors 208 can refer to built-in video image sensors of the carrier vehicle 110. For example, the video image sensors 208 can refer to one or more built-in cameras included as part of the carrier vehicle's Advanced Driver Assistance Systems (ADAS).

The perception device 103 can also comprise a high-precision automotive-grade positioning unit 210. The positioning unit 210 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the positioning unit 210 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the positioning unit 210 be configured to receive signals from all four of the aforementioned satellite navigation systems or three out of the four satellite navigation systems. For example, the positioning unit 210 can be a ZED-F9K dead reckoning module provided by u-blox holding AG.

The positioning unit 210 can provide positioning data that can allow the perception device 103 to determine its own location at a centimeter-level accuracy. The positioning unit 210 can also provide positioning data that can be used by the perception device 103 to determine the location of the offending vehicle 114. For example, the perception device 103 can use positioning data concerning its own location to substitute for the location of the offending vehicle 114. The perception device 103 can also use positioning data concerning its own location to estimate or approximate the location of an offending vehicle 114.

In other embodiments, the perception device 103 can determine the location of the offending vehicle 114 by recognizing an object or landmark (e.g., a bus stop sign) near the offending vehicle 114 with a known geolocation associated with the object or landmark. In these embodiments, the perception device 103 can use the location of the object or landmark as the location of the offending vehicle 114. In further embodiments, the location of the offending vehicle 114 can be determined by factoring in a distance calculated between the perception device 103 and the offending vehicle 114 based on a size of the license plate shown in one or more video frames of the video captured by the perception device 103 and a lens parameter of one of the video image sensors 208 (e.g., a zoom factor of the lens).

FIG. 2A also illustrates that the perception device 103 can comprise a vehicle bus connector 212. For example, the vehicle bus connector 212 can allow the perception device 103 to obtain wheel odometry data 216 from a wheel odometer of the carrier vehicle 110 carrying the perception device 103. For example, the vehicle bus connector 212 can be a J1939 connector. The perception device 103 can take into account the wheel odometry data 216 to determine the location of the offending vehicle 114.

FIG. 2A illustrates that the perception device 103 can comprise a PMIC 214. The PMIC 214 can be used to manage power from a power source. In some embodiments, the perception device 103 can be powered by a portable power source such as a battery. In other embodiments, the perception device 103 can be powered via a physical connection (e.g., a power cord) to a power outlet or direct-current (DC) auxiliary power outlet (e.g., 12V/24V) of the carrier vehicle 110.

Figure 2B:
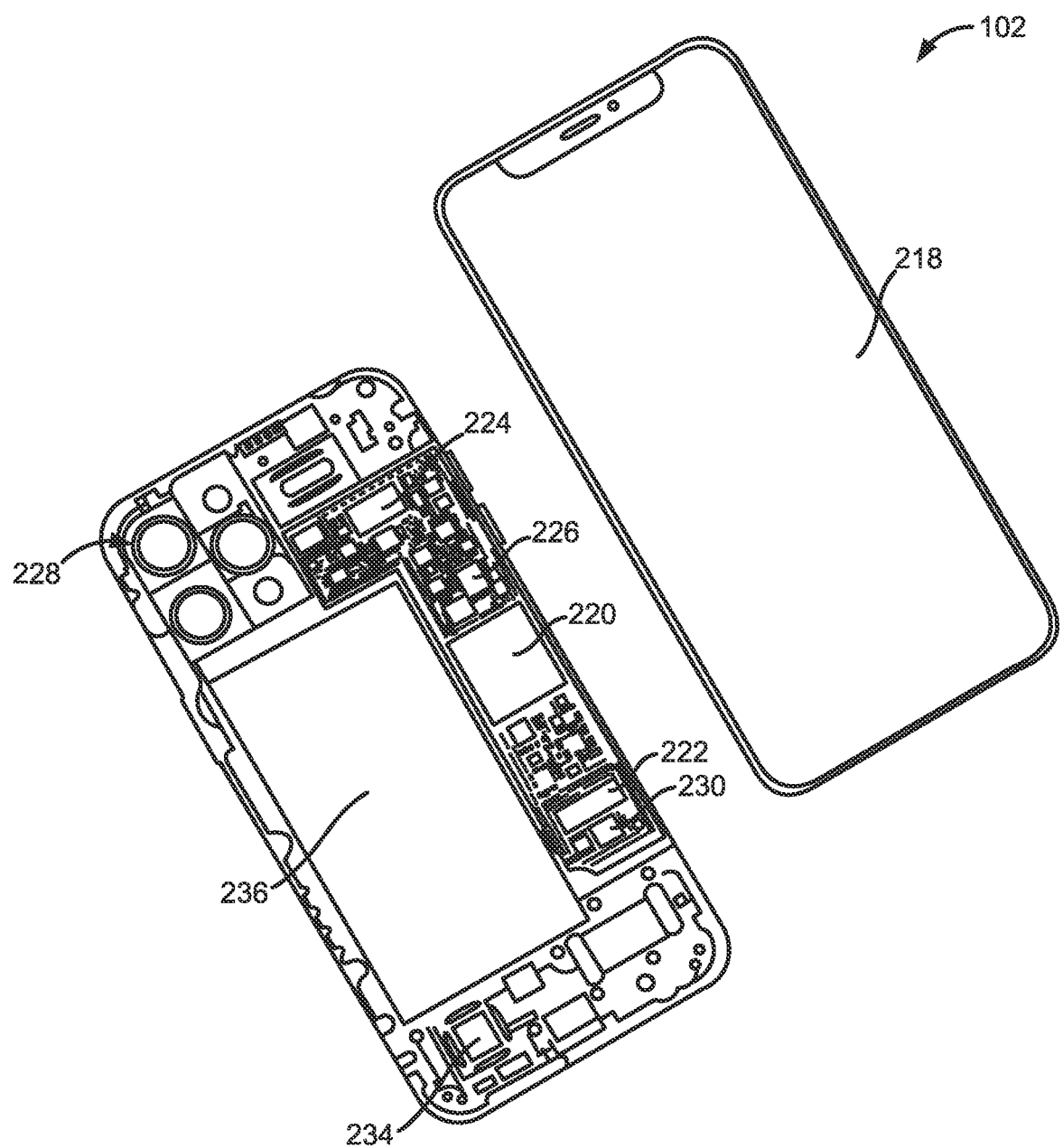
FIG. 2B illustrates one embodiment of a mobile device of the system implemented as a personal communication device such as a smartphone.

FIG. 2B illustrates one embodiment of a mobile device 102 of the system 100 with a display 218 of the mobile device 102 separated from the remainder of the mobile device 102 for ease of viewing. As shown in FIG. 2B, the mobile device 102 can be implemented as a personal communication or computing device such as a smartphone. In other embodiments, the mobile device 102 can be implemented as another type of personal communication or computing device such as a tablet computer, a laptop computer, or a pair of smart eyeglasses or sunglasses.

For purposes of this disclosure, any references to the mobile device 102 can also be interpreted as a reference to a specific component, processor, module, chip, or circuitry within the mobile device 102.

As shown in FIG. 2B, the mobile device 102 (e.g., the personal communication or computing device) can comprise one or more processors 220, memory and storage units 222, wireless communication modules 224, inertial measurement units (IMUs) 226, and video image sensors or cameras 228. The mobile device 102 can also comprise a positioning unit 230, a power management integrated circuit (PMIC) 234, and a portable power storage unit 236. The components of the mobile device 102 can be connected to one another via high-speed buses or interfaces.

The processors 220 can include one or more central processing units (CPUs), graphical processing units (GPUs), Application-Specific Integrated Circuits (ASICs), field-programmable gate arrays (FPGAs), or a combination thereof. The processors 220 can execute software stored in the memory and storage units 222 to execute the methods or instructions described herein.

For example, the processors 220 can refer to one or more CPUs of a processor module configured to perform operations or undertake calculations. The processors 220 of the mobile device 102 can be configured to run one or more deep learning models or neural networks and process data from multiple high-resolution sensors such as the plurality of video image sensors or cameras 228.

In some embodiments, the processors 220 can comprise tensor cores and a deep learning accelerator (DLA) or other specially-designed circuitry optimized for deep learning algorithms.

In certain embodiments, at least some of the processors 220 can be utilized for object detection and license plate recognition. Moreover, at least some of the processors 220 can also be utilized for simultaneous localization and mapping. The processors 220 can also be used to run other functions and maintain the operation of the mobile device 102.

The memory and storage units 222 can comprise volatile memory and non-volatile memory or storage. For example, the memory and storage units 222 can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. Although FIG. 2A illustrates the memory and storage units 222 as separate from the processors 220, it should be understood by one of ordinary skill in the art that the memory and storage units 222 can be part of a processor module comprising at least some of the processors 220. The memory and storage units 222 can store software, firmware, data (including video and image data), tables, logs, databases, or a combination thereof.

The wireless communication modules 224 can comprise at least one of a cellular communication module, a WiFi communication module, a Bluetooth® communication module, or a combination thereof. For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards.

The WiFi communication module can allow the mobile device 102 to communicate over one or more WiFi (IEEE 802.11) commination protocols such as the 802.11n, 802.11ac, or 802.11ax protocol. The Bluetooth® module can allow the mobile device 102 to communicate with other mobile devices or client devices over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules 224 can comprise a combined WiFi and Bluetooth® module.

Each of the IMUs 226 can comprise a 3-axis accelerometer, a 3-axis gyroscope, a 3-axis magnetometer, or a combination thereof. For example, the 3-axis accelerometer can be a 3-axis microelectromechanical system (MEMS) accelerometer and a 3-axis MEMS gyroscope. As a more specific example, the IMUs 226 can be IMUs provided by Bosch Sensortec GmbH.

The mobile device 102 can comprise one or more built-in video image sensors or cameras 228. As a more specific example, the mobile device 102 can comprise three or four video image sensors or cameras 228. At least one of the video image sensors 228 can be configured to capture video at a frame rate of between 1 frame per second and 120 frames per second (FPS) (e.g., about 30 FPS). In other embodiments, at least one of the video image sensors 228 can be configured to capture video at a frame rate of between 20 FPS and 80 FPS. Moreover, at least one of the video image sensors or cameras 228 can capture high dynamic range (HDR) images or videos. In some embodiments, the video image sensors 228 can be or comprise ultra-low-light CMOS image sensors.

The mobile device 102 can also comprise a high-precision positioning unit 230 having a global positioning system (GPS) receiver. The GPS receiver can receive GPS signals from a GPS satellite. The positioning unit 230 can provide positioning data that can allow the mobile device 102 to determine its own location at a high-level accuracy. The positioning unit 230 can also provide positioning data that can be used by the mobile device 102 to approximate the location of the offending vehicle 114. For example, the mobile device 102 can use positioning data concerning its own location to substitute for the location of the offending vehicle 114.

In other embodiments, the mobile device 102 can determine the location of the offending vehicle 114 by recognizing an object or landmark (e.g., a bus stop sign) near the offending vehicle 114 with a known geolocation associated with the object or landmark. In these embodiments, the mobile device 102 can use the location of the object or landmark as the location of the offending vehicle 114. In further embodiments, the location of the offending vehicle 114 can be determined by factoring in a distance calculated between the mobile device 102 and the offending vehicle 114 based on a size of the license plate shown in one or more video frames of the video captured by the mobile device 102 and a lens parameter of one of the video image sensors 228 (e.g., a zoom factor of the lens).

The mobile device 102 can also comprise a PMIC 234 and a portable power storage unit 236. The PMIC 234 can be used to manage power from a power source. In some embodiments, the mobile device 102 can be powered by a rechargeable battery (e.g., a lithium-ion battery) serving as the portable power storage unit 236.

The display 218 of the mobile device 102 can be a touchscreen display such as a liquid crystal display (LCD), an organic light-emitting diode (OLED) display, an active-matrix organic light-emitting diode (AMOLED) display, a super-AMOLED (S-AMOLED) display, a super LCD display (S-LCD), a thin film transistor (TFT) display, or a flexible instance of the aforementioned displays. In certain embodiments, the display 218 can be a retina display, a haptic touchscreen, or a combination thereof. For example, when the mobile device 102 is a smartphone, the display 218 can be the touchscreen display of the smartphone.

Similar to the perception device 103 shown in FIG. 2A, the mobile device 102 can also be positioned near a windshield or window of a vehicle of a user via a phone or tablet holder coupled to the windshield, window, dashboard, deck, mount, or body of the vehicle.

Figure 2C:
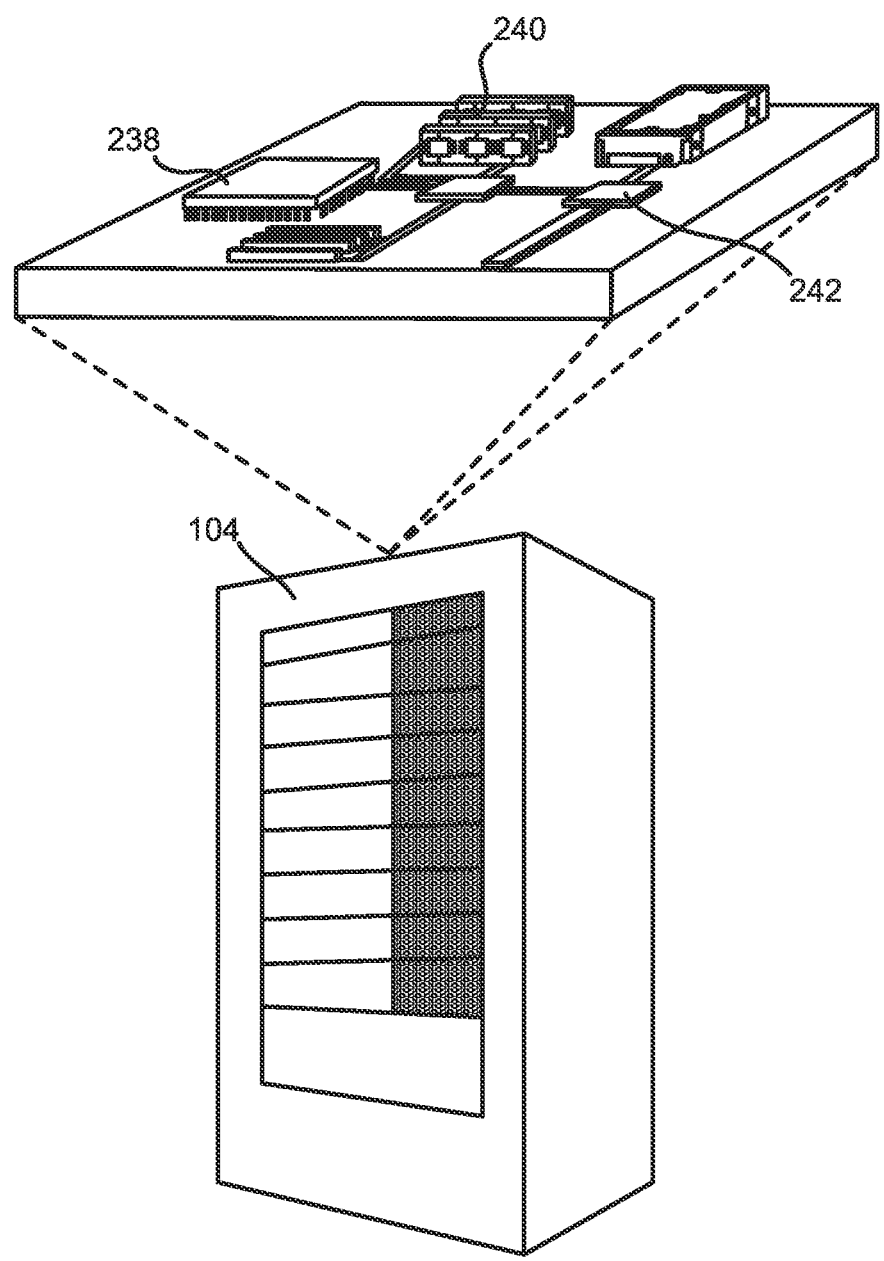
FIG. 2C illustrates one embodiment of a server of the system.

FIG. 2C illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 238, server memory and storage units 240, and a server communication interface 242. The server processors 238 can be coupled to the server memory and storage units 240 and the server communication interface 242 through high-speed buses or interfaces.

The one or more server processors 238 can comprise one or more CPUs, GPUs, ASICs, FPGAs, or a combination thereof. The one or more server processors 238 can execute software stored in the server memory and storage units 240 to execute the methods or instructions described herein. The one or more server processors 238 can be embedded processors, processor cores, microprocessors, logic circuits, hardware FSMs, DSPs, or a combination thereof. As a more specific example, at least one of the server processors 238 can be a 64-bit processor.

The server memory and storage units 240 can store software, data (including video or image data), tables, logs, databases, or a combination thereof. The server memory and storage units 240 can comprise an internal memory and/or an external memory, such as a memory residing on a storage node or a storage server. The server memory and storage units 240 can be a volatile memory or a non-volatile memory. For example, the server memory and storage units 240 can comprise nonvolatile storage such as NVRAM, Flash memory, solid-state drives, hard disk drives, and volatile storage such as SRAM, DRAM, or SDRAM.

The server communication interface 242 can refer to one or more wired and/or wireless communication interfaces or modules. For example, the server communication interface 242 can be a network interface card. The server communication interface 242 can comprise or refer to at least one of a WiFi communication module, a cellular communication module (e.g., a 4G or 5G cellular communication module), and a Bluetooth®/BLE or other-type of short-range communication module. The server 104 can connect to or communicatively couple with each of the mobile devices 102 and perception devices 103 via the server communication interface 242. The server 104 can transmit or receive packets of data using the server communication interface 242.

FIG. 3 illustrates in detail certain modules and engines of the mobile device 102, the perception device 103, and the server 104 and how the server 104 uses the content lake 107 to handle ingestion of data and files received from the mobile device 102 and the perception device 103.

A user of the mobile device 102 can report a traffic violation by opening a mobile application 300 running on the mobile device 102. In some embodiments, the mobile application can be an Apple® iOS mobile application or an Android® mobile application.

The user can then apply a user input to one or more user interface (UI) icons (e.g., a report UI icon 602, see FIG. 6A) to capture an image or video 112 of an offending vehicle 114 committing a potential traffic violation. For example, the offending vehicle 114 can be parked or otherwise stopped in a restricted area 116 such as a bus lane or bike lane.

In some embodiments, the mobile application 300 can require that the user capture multiple images or videos 112 from at least three or four different viewing angles such that different sides of the offending vehicle 114 and at least part of the restricted area 116 are shown in the images or videos 112. For example, the mobile application 300 can require that the user capture images or videos 112 of at least a front/rear of the vehicle and the two sides of the vehicle along with at least part of the restricted area 116.

In other embodiments, the mobile application 300 can allow the user to capture and submit only one image or video 112. In certain embodiments, the mobile application 300 can only allow the user to submit the image(s) or videos(s) 112 if at least one image or video 112 shows the license plate number 126 of the offending vehicle 114.

The mobile application 300 can then generate an extended metadata tag 118 associated with the captured image(s) or video(s) 112. The extended metadata tag 118 can be composed of a plurality of constituent metadata tags containing data or information gleaned from the captured image(s) or video(s) 112. For example, the extended metadata tag 118 can comprise data or information concerning a location 120 and time 122 of the potential traffic violation.

In some embodiments, the mobile application 300 can initially use the location (e.g., the latitude and longitude) of the mobile device 102 when the mobile device 102 captured the image(s) or video(s) 112 as the location 120 of the potential traffic violation. The location of the mobile device 102 can be parsed or extracted from metadata generated by a native camera application of the mobile device 102. In other embodiments, the mobile application 300 and/or the server 104 can use landmarks, signs, or other objects detected from the image(s) or video(s) 112 to more accurately pinpoint or refine the location 120.

The mobile application 300 can also use a time recorded by the mobile device 102 when the image(s) or video(s) 112 were captured as the time 122 of the potential traffic violation. For example, the mobile application 300 can use a time recorded by the mobile device 102 when a user applies a user input to the report UI icon 602 (see FIG. 6A) as the time 122 of the potential traffic violation.

The extended metadata tag 118 can also comprise a number of metadata tags generated using predictions outputted by one or more deep learning models configured to conduct automatic object detection or recognition on the images or videos 112 captured by the mobile device 102. For example, the extended metadata tag 118 can comprise metadata tags concerning a vehicle type 124 of the offending vehicle 114 and a license plate number 126 of the offending vehicle 114.

As shown in FIG. 3, the mobile device 102 can comprise a computer vision library 302 having a plurality of computer vision tools and toolkits, an event detection engine 304, and a license plate recognition engine 306. It is contemplated by this disclosure and it should be understood by one of ordinary skill in the art that the computer vision library 302, the event detection engine 304, and the license plate recognition engine 306 can be implemented as software modules or routines included as part of the mobile application 300.

Software instructions run on the mobile device 102, including any of the engines and modules disclosed herein, can be written in the Objective-C programing language, Swift® programming language, Java® programming language, JavaScript programming language, Python® programming language, Kotlin® programing language, Golang™ programming language, C++ programming language, or a combination thereof.

Once the mobile device 102 has captured the image(s) or video(s) 112, the mobile application 300 can call a plurality of functions from the computer vision library 302 to process the image(s) or video(s) 112. For example, the mobile application 300 can call one or more functions from the computer vision library 302 to read or extract video frames from any of the videos 112 captured. The mobile application 300 can then call additional functions from the computer vision library 302 to crop, resize, or rotate the images or video frames in order to allow the images or video frames to be analyzed by certain machine learning or deep learning models.

In one example embodiment, the computer vision library 302 can be the OpenCV® library maintained and operated by the Open Source Vision Foundation. In other embodiments, the computer vision library 302 can be or comprise functions from the TensorFlow® software library, the SimpleCV® library, or a combination thereof.

The event detection engine 304 can then pass the processed images or video frames to a deep learning model 308 running as part of the event detection engine 304. In some embodiments, the deep learning model 308 can comprise a convolutional neural network trained to automatically identify or detect objects in digital images or video frames. The objects detected can comprise vehicles, pedestrians, roads, trees, buildings, curbs, sidewalks, traffic lights, traffic signs, street signs, fire hydrants, parking meters, etc. The deep learning model 308 can also output predictions concerning an object class or object label for each of the detected objects.

In some embodiments, the convolutional neural network can be a modified version of the DetectNet deep neural network. In other embodiments, the convolutional neural network can be the You Only Look Once Lite (YOLO Lite) object detection network. The deep learning model 308 can comprise a plurality of convolutional layers and fully connected layers trained for object detection.

The object class or object label can include a vehicle type 128 of any vehicles detected in the images or video frames. For example, the vehicle type 128 can comprise "car," "truck," "van," or "bus." In some embodiments, the vehicle type 128 can also comprise different types of municipal or service vehicles such as "police car," "ambulance," "garbage truck," or "street sweeper."

The deep learning model 308 can also provide a confidence level associated with each of the object classes or object labels outputted by the deep learning model 308. For example, the deep learning model 308 can identify the offending vehicle 114 shown in the image(s) or video(s) 112 as a "car" with a confidence level of 98%.

The mobile application 300 can incorporate the predicted object classes or object labels and their accompanying prediction confidence levels into the extended metadata tag 118. For example, the mobile application 300 can incorporate at least the vehicle type 128 of the offending vehicle into the extended metadata tag 118.

In some embodiments, the extended metadata tag 118 can include other objects detected by the deep learning model 308 within the image(s) or videos 112. As will be discussed in later sections, the other detected objects can be used by the server 104 to construct a digital twin 358 of a municipality or area(s) therein.

The mobile device 102 can also comprise a license plate recognition engine 306. The license plate recognition engine 306 can be configured to recognize license plate numbers 126 of vehicles in the image(s) or video(s) 112 captured by the mobile device 102. For example, the license plate recognition engine 306 can pass an image or video frame captured by the mobile device 102 to another deep learning model 310 (e.g., a convolutional neural network) specifically trained to recognize license plate numbers from images or video frames. For example, the deep learning model 310 can be or comprise the OpenALPR™ license plate recognition model. The license plate recognition engine 306 can use the deep learning model 310 to recognize alphanumeric strings representing the license plate number 126 from images or video frames containing license plates.

In alternative embodiments, the license plate recognition engine 306 can be run on the server 104. In additional embodiments, the license plate recognition engine 306 can be run on both the mobile device 102 and the server 104.

In some embodiments, the user can also manually input the license plate number 126 and the vehicle type 124 of the offending vehicle 114 directly into the mobile application 300 (e.g., via input boxes or selection icons).

The extended metadata tag 118 can also comprise a metadata tag concerning a violation type 128 (e.g., a bus-lane violation, no-parking zone violation, a handicapped parking violation, etc.). In some embodiments, the violation type 128 can be automatically detected based on one or more objects (e.g., fire hydrants, parking meters, etc.) or signs (e.g., no parking signs, handicap parking signs, etc.) detected within a vicinity of the offending vehicle 114. For example, the one or more objects or signs can be detected using the deep learning model 308 trained for object-detection or other optical character recognition techniques. As a more specific example, the event detection engine 304 can automatically assign a violation type 128 when one of these objects or signs is detected within the image(s) or video(s) 112. In other embodiments, the violation type 128 can be selected in response to a user applying a user input to a violation selection GUI 606 (see FIG. 6B) displayed via the mobile application 300.

The mobile application 300 can transmit the captured image(s) and video(s) 112 along with the extended metadata tag 118 to the server 104 to be stored as unstructured content in the content lake 107. The content lake 107 can be configured to handle ingestion of all data and files received from the mobile devices 102 and perception devices 103.

As shown in FIG. 3, the perception device 103 can comprise a computer vision library 312 having a plurality of computer vision tools and toolkits, an event detection engine 314, a license plate recognition engine 316, and a localization and mapping engine 318. It is contemplated by this disclosure and it should be understood by one of ordinary skill in the art that the computer vision library 312, the event detection engine 314, the license plate recognition engine 316, and the localization and mapping engine 318 can be implemented as software modules or routines run on the perception device 103.

Software instructions run on the perception device 103, including any of the engines and modules disclosed herein, can be written in the Java® programming language, C++ programming language, Python® programming language, Golang™ programming language, or a combination thereof.

As previously discussed, the perception device 103 can be mounted or otherwise coupled to a carrier vehicle 110 (e.g., the windshield of the carrier vehicle 110). The perception device 103 can continuously capture images or videos 112 of an external environment within a field of view of the perception device 103. For example, the video image sensors 208 of the perception device 103 can capture everything that is within a combined field of view 512 (see, e.g., FIG. 5C) of the video image sensors 208.

The perception device 103 can call a plurality of functions from a computer vision library 312 to process the images or videos 112. For example, the perception device 103 can call one or more functions from the computer vision library 312 to read or extract video frames from any of the videos 112 captured. The perception device 103 can then call additional functions from the computer vision library 312 to crop, resize, or rotate the images or video frames in order to allow the images or video frames to be analyzed by certain machine learning or deep learning models.

In some embodiments, the computer vision library 312 can be the same as the computer vision library 302 run on the mobile device 102. For example, the computer vision library 312 can be the OpenCV® library maintained and operated by the Open Source Vision Foundation. In other embodiments, the computer vision library 312 can be or comprise functions from the TensorFlow® software library, the SimpleCV® library, or a combination thereof.

The event detection engine 314 can then pass the processed images or video frames to one or more deep learning models 320 running on the perception device 103. The event detection engine 314 can then analyze the images or video frames from such videos 112 to make an initial determination as to whether a potential traffic violation has occurred.

For example, the event detection engine 314 can pass the cropped, resized, and/or rotated images or video frames to one or more deep learning models 320 running on the perception device 103. In some embodiments, the deep learning models 320 can comprise a first convolutional neural network trained to automatically identify or detect objects in digital images or video frames and a second convolutional neural network trained to automatically detect lanes and/or lane markings on roadways in digital images or video frames. The first convolutional neural network can output predictions concerning the objects detected within the images or video frames. The second convolutional neural network can also output predictions concerning the lanes and/or lane markings detected within the images or video frames.

In some embodiments, the first convolutional neural network can be a modified version of the DetectNet deep neural network. In other embodiments, the first convolutional neural network can be the You Only Look Once Lite (YOLO Lite) object detection network. The first convolutional neural network can comprise a plurality of convolutional layers and fully connected layers trained for object detection.

The first convolutional neural network can also provide a confidence level associated with each of the object classes or object labels outputted by the first convolutional neural network. For example, the first convolutional neural network can identify the offending vehicle 114 shown in the image(s) or video(s) 112 as a "car" with a confidence level of 98%.

The second convolutional neural network can be the Segnet deep neural network trained for lane-detection. In certain embodiments, the second convolutional neural network can be the multi-headed convolutional neural network disclosed in U.S. patent application Ser. No. 17/242,969 filed on Apr. 28, 2021, the contents of which are incorporated herein by reference in its entirety.

When the potential traffic violation involves the offending vehicle 114 parked in a restricted area 116 such as a bus lane or bike lane. The first convolutional neural network can identify and detect the offending vehicle 114 as a vehicle and also detect the vehicle type 124 (e.g., car) of the offending vehicle 114. The second convolutional neural network can automatically detect the lane or road area occupied by the offending vehicle 114 as a restricted area 116 such as a bus lane or bike lane.

The event detection engine 314 can then bound the offending vehicle 114 shown in the images or video frames with a vehicle bounding box and bound at least part of the restricted area 116 in a road bounding box or bounding polygon. Bounding the detected objects and lanes in bounding boxes is further disclosed in U.S. patent application Ser. No. 17/242,969 filed on Apr. 28, 2021.

The event detection engine 314 can then make an initial determination that a potential traffic violation has occurred based in part on any overlap between the vehicle bounding box and the road bounding box or bounding polygon. For example, the event detection engine 314 can calculate a lane occupancy score based o the amount of overlap between the vehicle bounding box and the road bounding box or bounding polygon. The event detection engine 314 can then use the calculated lane occupancy score to determine whether a potential traffic violation has occurred.

Once the event detection engine 314 has determined that a potential traffic violation has occurred, the perception device 103 can prepare an extended metadata tag 118 associated with the images or videos 112. The perception device 103 can incorporate predictions outputted by the deep learning models into the extended metadata tag 118. For example, the perception device 103 can incorporate a prediction concerning a vehicle type 128 of the offending vehicle 114 into the extended metadata tag 118.

The extended metadata tag 118 can also comprise data or information obtained as outputs from other engines running on the perception device 103. For example, the perception device 103 can comprise a license plate recognition engine 316. The license plate recognition engine 316 can be configured to recognize license plate numbers 126 of vehicles in the image(s) or video(s) 112 captured by the perception device 103. For example, the license plate recognition engine 316 can pass an image or video frame captured by the perception device 103 to another deep learning model 322 (e.g., a convolutional neural network) specifically trained to recognize license plate numbers from images or video frames. For example, the deep learning model 322 can be or comprise the OpenALPR™ license plate recognition model. The license plate recognition engine 316 can use the deep learning model 322 to recognize alphanumeric strings representing the license plate number 126 from images or video frames containing license plates.

In some embodiments, the perception device 103 can comprise a dedicated license plate recognition (LPR) camera (see FIGS. 5A and 5D) and the license plate recognition engine 316 can pass images or video frames captured by the dedicated LPR camera to the deep learning model 322 to recognize license plate numbers of vehicles shown in the images or video frames. In other embodiments, the license plate recognition engine 316 can pass images or video frames captured by one of the HDR image sensors (any of the first video image sensor 208A, the third video image sensor 208C, or the fourth video image sensor 208D of FIG. 2A) to the deep learning model 322 to recognize license plate numbers of vehicles shown in the images or video frames.

The extended metadata tag 118 can also comprise the time 122 and location 120 of the potential traffic violation. The perception device 103 can use a time recorded by the perception device 103 when the image(s) or video(s) 112 were captured as the time 122 of the potential traffic violation. The location of the potential traffic violation can be determined by the localization and mapping engine 318.

The localization and mapping engine 318 can determine the location 120 of the offending vehicle 114 using any combination of positioning data obtained from the positioning unit 210, inertial measurement data obtained from the IMUs 206, and wheel odometry data 216 obtained from the wheel odometer of the carrier vehicle 110 carrying the perception device 103. For example, the localization and mapping engine 318 can use positioning data concerning the current location of the perception device 103 to estimate or approximate the location of the offending vehicle. Moreover, the localization and mapping engine 318 can determine the location of the offending vehicle 114 by recognizing an object or landmark (e.g., a bus stop sign) near the vehicle with a known geolocation associated with the object or landmark. In some embodiments, the localization and mapping engine 318 can further refine the determined location of the offending vehicle by factoring in a distance calculated between the perception device 103 and the offending vehicle based on a size of the license plate shown in one or more video frames and a lens parameter of one of the video image sensors 208 (e.g., a zoom factor of the lens) of the perception device 103.

In some embodiments, the localization and mapping engine 318 can be configured to undertake simultaneous localization and mapping of certain objects and/or roadways detected within the images or videos 112 captured by the perception device 103. The localization and mapping engine 318 can determine or estimate the locations of such detected objects and/or roadways and associate the locations with such objects and/or roadways.

The perception device 103 can transmit at least some of the images or a portion of the videos 112 along with an extended metadata tag 118 associated with the images or videos 112 to the server 104 to be stored as unstructured content in the content lake 107. In some embodiments, the extended metadata tag 118 can also include metadata tags concerning other objected detected by the deep learning model besides the offending vehicle 114. As will be discussed in later sections, the other detected objects can be used by the server 104 to construct a digital twin 358 of a municipality or area(s) therein.

FIG. 3 illustrates that all images or videos 112 and their accompanying extended metadata tags 118 received from the mobile devices 102 and perception devices 103 can be stored as unstructured data in the content lake 107. In some embodiments, the data or content received from the mobile devices 102 and perception devices 103 can be structured content (e.g., relational data). In these embodiments, the structured content can be stored along with the unstructured content in the content lake 107.

The content lake 107 can also be referred to as a data lake. The content lake 107 can be cloud-based and can be distributed among numerous cloud-based storage nodes.

Content stored in the content lake 107 can be initially stored in a flat and scalable manner that allows the content to be easily and efficiently ingested. The content lake 107 can allow the ingested content to be in its native or raw format without having to define the schema or data requirements prior to implementation of the content lake 107 (i.e., schema-on-read versus schema-on-write). The content lake 107 can provide the server 104 and other devices communicatively coupled to the server quick and flexible access to all content stored in the content lake 107. Moreover, content within the content lake 107 does not need to be moved and the content lake 107 can be cost-effectively scaled when more storage space is needed to accommodate content received from additional users and/or devices.

In one example embodiment, the content lake 107 can be implemented as an Amazon™ Single Storage Service (Amazon™ S3) repository. In other embodiments, the content lake 107 can be implemented as a Microsoft Azure™ data lake. In further embodiments, the content lake 107 can be implemented as a Hadoop™ data lake.

In some embodiments, an event identifier or identification code (event ID) 320 can be created to identify a potential traffic violation and associate all content (e.g., images, videos, and other user-generated content) involving the potential traffic violation with one another. For example, a folder can be created in the content lake 107 using the event ID 320 as the folder name and all content associated with the potential traffic violation can be saved in this folder.

The event ID 320 can be generated using a hash function based on one or more device identifiers, a username of the user, and a timestamp reflecting the time 122 of the potential traffic violation as determined by the mobile device 102 or the perception device 103. In certain embodiments, the hash function can be an MD5 hash function. In other embodiments, the hash function can be a universally unique identifier (UUID)/global unique identifier (GUID) hash function. For example, an event ID 320 can be created using the following function: md5_hash(device_id+user_id+timestamp_of_event+secret code), wherein the "+" symbol means the string is concatenated, wherein the device_id=md5_hash(device_MAC address+device serial number+secret code), wherein the user_id=md5_hash(username+secret code), wherein the username is a phone number or email address of the user, and wherein the secret code is known only to the administrator of the system 100. The result can be a unique event ID 320 that is a 128 bit binary number represented by 32 hexadecimal digits.

In some embodiments, an index file 322 or interpreter file can also be generated and saved within the folder containing the content associated with the potential traffic violation. As previously discussed, the name of the folder can be the event ID 320 used to identify the potential traffic violation. Using this index file 322, the server 104 or another device having access to the content lake 107 can locate and retrieve all content and files associated with the potential traffic violation including all image files, video files, and metadata files (e.g., the extended metadata tag 118).

In certain embodiments, the index file 322 can be a JSON file. In other embodiments, the index file 322 can be a .txt file or an XML file.

Below is an example of an index file 322 in the JSON file format:

index.json
{
  "application version:": "1.0",
  "event_id": "189a9775-cff8-4e49-bf83-6a6ae61b6106",
  "user_id": "009eb444-a38b-42a7-b505-b08664678180",
  "device_id": "75f3445c-07ac-4691-bee3-f2aaf2a43423",
  "image": ["0-source.jpg", "1-source.jpg", "2-source.jpg" . . . ],
  "video": ["0-souce.mp4", "1-source.mp4" . . . ],
  "extended_metadata_tag": "meta.json",
  "ts_sec": 1933029025,
  "ts_nsec": 550000000
}

In the above example, "ts_sec" and "ts_nsec" are timestamps reflecting the time 122 of the potential traffic violation as determined by either the mobile device 102 or the perception device 103 in seconds and nanoseconds, respectively. The index file 322 can be updated in response to new files being added to the folder as files (e.g., the images or videos 112 are further processed by certain modules of the server 104) or when files are changed into different file formats for downstream presentation.

As shown in FIG. 3, the server 104 can generate or update a plurality of database tables 324 in a database layer on top of the content lake 107. The database tables 324 can be relational database tables (e.g., an SQL database table), non-relational database tables (e.g., a NoSQL key-value store), a column-oriented database table, or any combination thereof.

The database tables 324 can comprise at least a location table 326, a time table 328, an event table 330, a user table 332, and a device table 334. The database tables 324 can be generated or updated based in part on the extended metadata tags 118 stored in the content lake 107. The database tables 324 can be generated or updated when at least one of a temporal threshold and a submission threshold is met.

For example, the temporal threshold can be an elapsed time since the last time the database tables 324 were created or updated. As a more specific example, the temporal threshold can be 5 minutes, 10 minutes, 30 minutes, 1 hour, 4 hours, 8 hours, 12 hours, or 24 hours. The submission threshold can be a number of submissions or uploads received from the mobile devices 102 and/or the perception devices 103 since the last time the database tables 324 were created or updated. For example, the submission threshold can be 10 submissions or uploads, 50 submissions or uploads, 100 submissions or uploads, 1000 submissions or uploads, 10000 submissions or uploads, etc.

In other embodiments, the server 104 can generate the database tables 324 or update existing database tables 324 in response to a request received from a user via a mobile device 102 or computing device 130.

The database tables 324 can be generated or updated in part by parsing the extended metadata tags 118 stored in the content lake 107. For example, the one or more server processors 238 can populate the various database tables 324 by parsing data or information from the extended metadata tags 118 previously stored in the content lake 107 and any newly-received extended metadata tags 118 that have not been parsed by the server 104.

In certain embodiments, the extended metadata tags 118 can be generated in the JSON file format. In other embodiments, the extended metadata tags 118 can be generated as .txt files or XML files.

Below is an example of a portion of an extended metadata tag 118 generated based on images and videos 112 captured by a mobile device 102 concerning a handicap parking violation:
meta.json

```
{
    "event_type" : "PK HANDICAPPED",
    "device_type": "IPHONE-X",
    "privacy_scope": [ "FACE", "NONVIOLATING VEHICLES" ]
    "privacy_level": "LEVEL_1_FILTER",
    "alt" : 28.117999999999999,
    "alt_err_deviation" : 3.9949900842867452e-315,
    "enforce_days" : [ 0, 1, 2, 3, 4, 5, 6 ],
    "enforce_end" : 24,
    "enforce_start" : 0,
    "lat" : 40.732659646999998,
    "lat_err_deviation" : 0,
    "lon": -73.825117113000005,
    "lon_err_deviation" : 0,
    "rms_deviation" : 0,
    "ts_sec" : 1933029025,
    "ts_nsec" : 550000000,
    "recognitions" : [
    {
        "boxes" : [
        {
            "box" : {
                "bottom" : 0.1,
                "left" : 0.2,
                "right" : 0.3,
                "top" : 0.4
            },
            "confidence" : 98.0171,
            "data" : "car"
        }
        "source" : "0-source.jpg"
        ],
    },
    {
        "boxes" : [
        }
            "box" : {
                "bottom" : 0.9,
                "left" : 0.1,
                "right" : 0.2,
                "top" : 0.3
            },
            "confidence": 92.34907,
            "data" : "ABCD123"
        }
        ],
        "source" : "3-source.jpg"
    }
    ]
}
```

The altitude (alt), latitude (lat), and longitude (lon) tags can be geo-coordinates obtained from the positioning unit 230 of the mobile device 102 or the positioning unit 210 of the perception device 103 that is used to approximate the location 120 of the potential traffic violation. The altitude error deviation (alt_err_deviation), latitude error deviation (lat_err_deviation), and longitude error deviation (lon_err_deviation) tags can be estimated deviation errors associated with the alt, lat, and lon geo-coordinates, respectively. The root mean square error deviation (rms_deviation) tag can be an overall root mean square deviation error calculated based on the estimated deviation errors. These deviation error values can convey a level of confidence associated with the location 120 of the potential traffic violation.

The event type (event_type) tag can be created in response to a selection or text input made by a user of the mobile device 102 concerning the violation type 128. The user can make the selection or apply text inputs via a GUI displayed on the mobile device 102. In alternative embodiments, the event type tag can contain a prediction outputted by a deep learning model concerning the violation type 128. The deep learning model can be one of the deep learning models running on the perception device 103 or mobile device 102. For example, images or video frames can be passed to the deep learning model to automatically recognize text on one or more traffic enforcement or parking signs in the vicinity of the offending vehicle 114 to obtain a prediction concerning the violation type 128.

The enforcement days (enforce_days) metadata tag can contain the day(s) of the week that a traffic or parking rule is enforced. The enforcement days metadata tag can be created in response to selection(s) or text input(s) made by a user of the mobile device 102 via a GUI displayed on the mobile device 102. Alternatively, the enforcement days can contain a prediction outputted by a deep learning model (e.g., one of the deep learning models running on the perception device 103 or mobile device 102) when images or video frames are passed to the deep learning model to automatically recognize text on one or more traffic enforcement or no-parking signs in the vicinity of the offending vehicle 114.

The enforcement start (enforce_start) and enforcement end (enforce_end) tags can comprise numerical values representing the enforcement start time(s) and enforcement end time(s), respectively, of the traffic rules. The timestamp-seconds (ts_sec) and timestamp-nanoseconds (ts_nsec) tags can be timestamps reflecting the time 122 of the potential traffic violation as determined by either the mobile device 102 or the perception device 103 in seconds and nanoseconds, respectively. As previously discussed, the mobile device 102 or the perception device 103 can use timestamps generated by the device when the images or videos 112 were captured to approximate the time 122 of the potential traffic violation.

The recognition (recognitions) metadata tags can contain predictions outputted by deep learning models running on either the mobile device 102 or the perception device 103 concerning the vehicle type 124 and the license plate number 126. In the example extended metadata tag 118 provided above, the recognition metadata tags include a prediction that the object detected in the image file titled "0-source.jpg" is a "car" and that the prediction was made with a confidence level of 98.0171%. Moreover, the recognition metadata tags also include a further prediction that a license plate number detected in the image file titled "3-source.jpg" is "ABCD123" and that the prediction was made with a confidence level of 92.34907%. The various box (boxes)

metadata tags record the location(s) of the detected objects (e.g., the car and the license plate) within the image or video frame.

The privacy-related metadata tags including the privacy scope (privacy scope) and the privacy filter level (privacy_level) metadata tags will be discussed in more detail in later sections focusing on the privacy module 348.

It is contemplated by this disclosure that the extended metadata tag 118 can also comprise additional metadata tags not presented in the example above including metadata tags representing other objects automatically detected in the various images and videos 112. Moreover, the extended metadata tag 118 can also comprise additional metadata tags populated by selections or text inputs made by the users of the mobile devices 102.

In some embodiments, the one or more server processors 238 can also populate the various database tables 324, in part, by parsing the index files 322 stored in the various event folders. For example, the one or more server processors 238 can parse the index files 322 to find all images or videos 112 associated with a potential traffic violation.

The database tables 324, including any combination of the location table 326, the time table 328, the event table 330, the user table 332, and the device table 334, can be used by various modules or engines of the server 104 to answer or respond to queries received from users of the system 100. For example, the queries can be traffic violation-related queries received from the mobile devices 102 and/or computing devices 130.

The location table 326 can organize the unstructured content (e.g., images and videos 112 captured by the mobile devices 102 and perception devices 103, extended metadata tags 118, index files 322, and other user-generated content) within the content lake 107 by the locations 120 of the potential traffic violations. Moreover, the time table 328 can organize the unstructured content within the content lake 107 by the time 122 of the potential traffic violations.

The evidence processing engine 336 of the server 104 can use the location table 326 and the time table 328 to determine whether content received from multiple devices (e.g., two or more mobile devices 102, two or more perception devices 103, or at least one mobile device 102 and perception device 103) are actually associated with the same potential traffic violation. For example, the evidence processing engine 336 of the server 104 can set a rule or heuristic that any images or videos 112 received from devices within 5 meters and 10 minutes of one another is actually of the same potential traffic violation.

As will be discussed in more detail in the following sections, the map module 338, the content feed module 340, and the analytics and insights module 342 can cross reference both the location table 326 and the time table 328 to construct interactive violation maps 804 (see, e.g., FIG. 8) and content feeds 904 (see, e.g., FIG. 9) to be displayed via the mobile application 300 in response to requests received from users of the system 100. Moreover, although FIG. 3 only illustrates one instance of each of the location table 326, the time table 328, the event table 330, the user table 332, and the device table 334, it is contemplated by this disclosure that multiple instances of each of the database tables 324 can be built on top of the content lake 107 and such database tables 324 can be generated or updated when at least one of a temporal threshold and a submission threshold is met.

The event table 330 can organize the unstructured content within the content lake 107 by the violation type 128. For example, a separate event table 330 can be created for each violation type 128. In other embodiments, content associated with multiple violation types 128 can be included in one event table 330. The event table 330 can be used by any of the map module 338 and the content feed module 340 to construct interactive violation maps 804 (see, e.g., FIG. 8) and content feeds 904 (see, e.g., FIG. 9) showing traffic violations of a particular violation type 128. The analytics and insights module 342 can also use the event table 330 to derive insights concerning any increases or decreases in traffic violations of a particular violation type 128. Moreover, the evidence processing engine 336 can use the event table 330 along with the location table 326 and the time table 328 to determine whether content received from multiple devices are actually of the same potential traffic violation. For example, if images or videos 112 received from multiple devices within 5 meters and 10 minutes of one another show traffic violations of the same violation type 128 then the server 104 can make a determination that all of the images or videos 112 received from the multiple devices show the same offending vehicle 114 committing the same potential traffic violation.

The database tables 324 can also comprise a user table 332 and a device table 334. The user table 332 can organize or associate all content received from a submitting user with that particular user. For example, users may request or subscribe to content feeds 904 that only show potential traffic violations reported by a certain submitting user if the users are appreciative of the quality or accuracy of reports submitted by that particular user.

The device table 334 can organize or associate all content transmitted or uploaded by a particular device (e.g., a mobile device 102 or perception device 103). For example, one of the perception devices 103 can be mounted or otherwise coupled to a bus that drives along a bus route that overlaps with a user's daily commute route. The user can subscribe to a content feed 904 that only shows potential traffic violations reported by this perception device 103 so the user can gain insights into potential traffic violations that may hinder the user's commute. The content feed 904 can be configured to automatically update and the subscribing mobile device 102 can be configured to receive a notification when the content feed 904 is automatically updated.

One technical problem faced by the applicants is how to design a system to effectively and efficiently store large amounts of short video-clips, images, and other user-generated content concerning potential traffic violations occurring at all times of the day and different locations and to make such video-clips, images, and other user-generated content readily available for further analysis and presentation through various content feeds and interactive map graphics rendered on demand. One technical solution discovered and developed by the applicants is to store the large amounts of short video-clips, images, and other user-generate content in a content lake 107 and to organize the content in a more structured manner in database layers built on top of the content lake 107.

FIG. 3 illustrates that the server 104 can comprise an evidence processing engine 336, a map module 338, a content feed module 340, an analytics and insights module 342, an engagement engine 344, a digital twin module 346, and a privacy module 348. The evidence processing engine 336 can further comprise a detection and recognition module 350 and a multi-view co-registration module 352.

Software instructions run on the server 104, including any of the engines and modules disclosed herein, can be written in the Ruby® programming language (e.g., using the Ruby on Rails® web application framework), Python® programming language, or a combination thereof.

It should be understood by one of ordinary skill in the art that even though FIG. 3 illustrates certain modules or engines as being distinct, such modules or engines can perform overlapping functions or can be merged with one another. Moreover, even though FIG. 3 illustrates certain modules or engines as being encompassed within other modules or engines, such modules or engines can also operate independently or be encompassed by other modules or engines. Moreover, certain modules or engines can communicate with one another and with other modules or engines not shown in the figures. Accordingly, the modules and engines depicted in FIG. 3 should be regarded in an illustrative rather than a restrictive sense.

The evidence processing engine 336 can be configured to further process the images and videos 112 stored in the content lake 107. For example, the detection and recognition module 350 of the evidence processing engine 336 can confirm or make corrections to the objects, lanes, and/or license plate numbers detected by the event detection engines 304 and the license plate recognition engines 306 of the mobile devices 102 and the event detection engines 314 and the license plate recognition engines 316 of the perception devices 103.

The detection and recognition module 350 can also conduct automatic object detection on images or videos 112 stored in the content lake 107 that have not previously undergone such detection or image recognition. This can occur if such images or videos 112 were received from mobile devices 102 that did not have the processing power to run the various deep learning models or if such detection or recognition processes were performed unsuccessfully on the mobile devices 102.

The detection and recognition module 350 can pass images or video frames from the images or videos 112 stored in the content lake 107 to deep learning models 354 running on the server 104. For example, the deep learning models 354 can comprise at least a convolutional neural network trained for object detection (e.g., a modified version of the DetectNet deep neural network) and a convolutional neural network trained for lane detection (e.g., a modified version of the Segnet deep neural network). The deep learning models 354 can output predictions concerning objects, lanes, and license plate numbers detected within the images and videos 112.

The detection and recognition module 350 can use the predictions outputted by the deep learning models 354 (i.e., the results of the automatic detection/recognition) to update or correct the extended metadata tags 118 stored in the content lake 107. Moreover, the detection and recognition module 350 can also pass the predictions outputted by the deep learning models 354 to other modules of the evidence processing engine 336 (such as the privacy module 348) and to other modules on the server 104 such as the map module 338 and the digital twin module 346. For example, the objects (e.g., fire hydrants, stop signs, traffic lights, street lights, etc.) detected by the detection and recognition module 350 can be passed to the map module 338 to populate semantic maps 356 constructed and maintained by the map module 338. Moreover, the objects detected by the detection and recognition module 350 can also be used to populate a digital twin 358 of a municipality (or parts thereof) generated by the digital twin module 346.

The multi-view co-registration module 352 can be configured to perform multi-view co-registration on images or video frames stored in the content lake 107 that are associated with the same potential traffic violation. The multi-view co-registration module 352 can perform the multi-view co-registration by identifying key points 704 (see, e.g., FIGS. 7A and 7B) from multiple images or video frames showing the same potential traffic violation. For example, the multiple images or video frames can show the same offending vehicle 114 from different viewing angles such that different sides of the offending vehicle 114 are captured in the multiple images or video frames.

The multi-view co-registration module 352 can use certain modified functions or tools derived from a computer vision library 360 to identify the key points 704 from the various images or video frames. For example, the computer vision library 360 can be the OpenCV® library maintained and operated by the Open Source Vision Foundation.

The multi-view co-registration module 352 can match at least some of the key points 704 from the images or video frames to one another using certain modified functions or tools derived from a computer vision library 360. The multi-view co-registration module 352 can then generate or construct one or more virtual 3D models 364 of the offending vehicle 114 using certain modified photogrammetry functions or tools derived from one or more photogrammetry libraries 362.

In some embodiments, Moreover, the photogrammetry libraries 362 can refer to open-source photogrammetry software libraries such as the OpenMVG library and the OpenMVS library, or a combination thereof. The process for multi-view co-registration will be discussed in more detail in later sections.

The privacy module 348 can be configured to apply an obfuscating filter or a blurring filter to objects detected in the one or more images or videos 112 received from the mobile devices 102 and the perception devices 103. The objects can be detected automatically by any of the deep learning models (e.g., any of the deep learning model 308, the deep learning models 320, and the deep learning models 354) trained for object-detection. As previously discussed, the objects detected can comprise vehicles (including a driver and passenger(s) therein), pedestrians, roads, trees, buildings, curbs, sidewalks, traffic lights, traffic signs, street signs, fire hydrants, and parking meters.

For example, the privacy module 348 can apply the obfuscating filter or the blurring filter to objects detected in the images or videos 112 received from the mobile devices 102 and the perception devices 103 before such images or videos 112 are stored in the content lake 107. In other embodiments, the privacy module 348 can apply the obfuscating filter or the blurring filter to objects detected in the images or videos 112 received from the mobile devices 102 and the perception devices 103 after such images or videos 112 are stored in the content lake 107. In further embodiments, the privacy module 348 can apply the obfuscating filter or blurring filter to objects detected in the images or videos 112 received from the mobile devices 102 and the perception devices 103 before such images or videos 112 (or clips thereof) are transmitted to any mobile devices 102 or computing devices 130 in response to any requests received from such devices to view traffic violation content.

Although FIG. 3 illustrates the privacy module 348 as being run on the server 104, it is contemplated by this disclosure that the privacy module 348 can also be run on the mobile device 102 (e.g., as part of the mobile application 300) and/or the perception device 103. For example, the privacy module 348 can be run on the mobile device 102 or the perception device 103 to apply the obfuscating filter or blurring filter to image(s) or video(s) 112 captured by the mobile device 102 or the perception device 103, respectively, before such image(s) or video(s) 112 are transmitted to the server 104.

The mobile devices 102 and the perception devices 103 can also have a scope of privacy protection (referred to herein as a "privacy scope") or certain privacy rules defined for such devices by an administrator of the system 100. For example, the privacy scope can require that the mobile devices 102 and perception devices 103 apply an obfuscating filter or a blurring filter to all faces of pedestrians, drivers, and passengers detected within the image(s) or video(s) 112 captured by such devices. Moreover, the privacy scope can require that the mobile devices 102 and perception devices 103 apply an obfuscating filter or a blurring filter to all non-offending vehicles detected within the image(s) or video(s) 112 captured by such devices. Furthermore, the privacy scope can require that the mobile devices 102 and perception devices 103 apply an obfuscating filter or a blurring filter to all license plate numbers 126 after such license plate numbers 126 have been recognized by their respective license plate recognition engines.

Alternatively, the privacy scope can require that the mobile devices 102 and perception devices 103 apply an obfuscating filter or a blurring filter to all objects detected within the image(s) or video(s) 112 captured by such devices besides the offending vehicle 114 and the license plate number 126 of the offending vehicle 114.

In certain embodiments, the privacy module 348 can set a privacy scope that the offending vehicle 114 and the license plate number 126 of the offending vehicle 114 remain visible or otherwise unblurred when the image(s) or video(s) 112 are transmitted to a computing device 130 of a transportation agency or law enforcement agency but that the license plate number 126 of the offending vehicle 114 is blurred or obfuscated when certain image(s) or video(s) 112 (or clips thereof) are transmitted to mobile devices 102 of non-governmental users.

The obfuscating filter or blurring filter can obfuscate or blur the detected objects to one of several filter levels. The filter levels can be preconfigured by an administrator of the system 100. The filter levels can depend on a pixel size of the obfuscating filter or blurring filter and the obfuscating algorithm used to generate the obfuscating/blurring effect. The pixel size of the obfuscating or filter can be expressed as "n×n" and can range from a 3×3 filter (a small amount of blurring) to a 11×11 filter (a large amount of blurring). For example, a filter of size n×n pixels can move as a rolling window or kernel over each pixel of the part of the image or video frame to be blurred and output a blurred pixel with a new color value or pixel intensity value that replaces the old pixel. The new color value or pixel intensity value of the blurred pixel can be calculated using a number of obfuscating or blurring algorithms including a Gaussian-distribution blurring algorithm or a weighted-average blurring algorithm that takes as inputs the color values or pixel intensity values of all of the surrounding n×n pixels.

The filter levels can range from a total blank out (LEVEL_1_FILTER), which is the most severe level of obfuscation, to a weighted-average 3×3 filter (LEVEL_2_FILTER). Other filter levels can include a Gaussian 3×3 filter (LEVEL_3_FILTER), a Gaussian 7×7 filter (LEVEL_4_FILTER), and a Gaussian 11×11 filter (LEVEL_5_FILTER).

In some embodiments, the privacy module 348 can obfuscate or blur the detected objects in the images or videos 112 based on the privacy scope and filter level indicated in the extended metadata tag 118. For example, as previously discussed, the extended metadata tag 118 can comprise a privacy scope metadata tag (privacy_scope) and a privacy filter level metadata tag (privacy_level). The privacy scope and privacy filter level metadata tags can be preconfigured and periodically changed by an administrator of the system 100. In other embodiments, the privacy scope and the privacy filter level can be set by the privacy module 348 of the server 104.

The map module 338 can be configured to generate an interactive violation map 804 (see, e.g., FIG. 8) displaying the potential traffic violations reported by the users of the system 100. The interactive violation map 804 can be displayed as part of an interactive map GUI 800 of the mobile application 300. The interactive map GUI 800, including the interactive violation map 804, can be displayed on the mobile device 102 of a user in response to the user applying a user input to a map UI icon 802.

The map module 338 can generate and maintain a number of semantic maps 356 associated with a municipality or part(s) thereof. The semantic maps 356 can be two-dimensional (2D) or three-dimensional (3D) maps annotated with semantic labels used to identify the objects detected by the various deep learning models (e.g., any of the deep learning model 308, the deep learning models 320, or the deep learning models 354).

The semantic maps 356 can be built on top of existing standard-definition maps such as geometric maps. The geometric maps can be georeferenced maps obtained from one or more mapping databases or mapping services. For example, the geometric maps can be obtained from a web mapping server along with data from a geographic information system (GIS) database. For example, the geometric maps can be obtained from an open-source mapping database or server or a proprietary mapping service. For example, the geometric maps can comprise one or more maps provided by Google Maps™, Esri™ ArcGIS maps, or a combination thereof. The geometric maps can also be obtained from one or more government mapping databases or government GIS maps. The geometric maps can comprise a plurality of high-definition (HD) maps, traditional standard-definition maps, or a combination thereof.

The semantic maps 356 can annotate the geometric maps with semantic labels used to identify the objects detected by the various deep learning models. The semantic maps 356 can be a fusion of mapping data and semantic labels obtained from multiple sources including, but not limited to, the plurality of mobile devices 102, perception devices 103, municipal mapping databases, or other government mapping databases, and third-party private mapping databases.

The semantic maps 356 can be accurate to within a few centimeters rather than a few meters and be annotated with semantic and geolocation information concerning objects within the maps. For example, lane lines, lane dividers, crosswalks, traffic lights, no-parking signs or other types of street signs, fire hydrants, parking meters, curbs, trees or other types of plants, or a combination thereof can be identified in the semantic maps 356 and their geolocations and any rules or regulations concerning such traffic-related objects can be stored as part of the semantic maps 356. As a more specific example, all bus lanes or bike lanes within a municipality and their hours of operation/occupancy can be stored as part of a semantic maps 356 of a municipality.

The semantic maps 356 can be updated periodically or continuously as the server 104 receives new mapping data, positioning data, and/or semantic labels from the perception devices 103 and the mobile devices 102. For example, a bus serving as a carrier vehicle 110 having a perception device 103 installed within the bus can drive along the same bus route multiple times a day. Each time the bus travels down a specific roadway or passes by a specific landmark (e.g., building or street sign), the perception device 103 on the bus can take video(s) of the environment surrounding the roadway or landmark. The videos can first be processed locally on the perception device 103 (using the computer vision tools and deep learning models previously discussed) and the outputs (e.g., the detected objects, semantic labels, and location data) from such detection can be transmitted to the map module 338 of the server 104 and compared against data already included as part of the semantic maps 356. If such labels and data match or substantially match what is already included as part of the semantic maps 356, the detection of this roadway or landmark can be corroborated and remain unchanged. If, however, the labels and data do not match what is already included as part of the semantic maps 356, the roadway or landmark can be updated or replaced in the semantic maps 356. The system 100 can update or replace one or more objects or landmarks shown in the maps if a confidence level/confidence value associated with a previous detection is lower than the confidence level/confidence value associated with a more recent detection undertaken by the same mobile device 102/perception device 103 or a different mobile device 102/perception device 103. This map updating procedure or maintenance procedure can be repeated as the server 104 receives more data or information from other perception devices 103 and mobile devices 102.

The server 104 can also transmit or deploy new semantic maps 356 or transmit semantic map updates to the perception devices 103. For example, the server 104 can transmit or deploy new semantic maps 356 or transmit semantic map updates periodically or when an update has been made to the existing semantic maps 356. The new semantic maps 356 or the semantic map updates can be used by the perception device 103 to more accurately localize and identify restricted areas 116 (e.g., bus lanes, bike lanes, etc.) to ensure accurate detection. Ensuring that the perception devices 103 have access to updated semantic annotated maps 356 reduces the likelihood of false positive detections.

The content feed module 340 can be configured to generate a scrollable content feed 904 of potential traffic violations reported by the users of the system 100. The content feed 904 can be displayed as part of a content feed GUI 900 (see FIG. 9) of the mobile application 300. The content feed GUI 900, including the content feed 904, can be displayed on the mobile device 102 of a user in response to the user applying a user input to a content feed UI icon 902.

The content feed module 340 can generate the content feed 904 by referencing data and information stored in the database tables 324 including at least the location table 326, the time table 328, and the event table 330. For example, the content feed module 340 can build more sophisticated tables such as a plurality of content channel database tables on top of the underlying database tables 324. The content feed module 340 can also populate the content feed 904 with images or videos 112 (or clips thereof) captured by the mobile devices 102 and/or the perception devices 103. The content feed module 340 can automatically update the content feed 904. The content feed module 340 can also transmit a notification (e.g., a push notification) to a subscribing mobile device 102 when the content feed 904 has been updated. The content feed 904 will be discussed in more detail in later sections.

The analytics and insights module 342 can be configured to provide insights or analytics concerning the potential traffic violations reported by the users of the system 100. The insights or analytics can be displayed as graphs, charts, or data presented as part of an analytics GUI 1000 (see FIG. 10) of the mobile application 300. The analytics GUI 1000 can be displayed on the mobile device 102 of a user in response to the user applying a user input to an analytics UI icon 1002.

The analytics and insights module 342 can generate the graphs, charts, or data presented as part of the analytics GUI 1000 by referencing data and information stored in the database tables 324 including at least the location table 326, the time table 328, and the event table 330. For example, the analytics and insights module 342 can build more sophisticated tables such as a plurality of analytics database tables on top of the underlying database tables 324.

For example, the analytics and insights module 342 can provide insights (e.g., in graph form) concerning the number of traffic violations reported in a given week, month, or year. The analytics and insights module 342 can also provide insights concerning the number of traffic violations reported based on the violation type 128. Furthermore, the analytics and insights module 342 can provide insights in real-time or near-real-time concerning traffic violations reported near a user.

The engagement engine 344 can be configured to provide incentives or rewards to users for reporting potential traffic violations. The incentive or rewards can be provided as reward points or tokens in a reward account set up for the user. The engagement engine 344 can also generate a rewards GUI 1100 (see, e.g., FIG. 11) configured to be displayed through the mobile application 300. A user's rewards or reward points can be incremented based on an amount of submissions or reports made by the user or the quality of such submissions or reports.

The digital twin module 346 can be configured to generate and maintain a digital twin 358 of a municipality or a part thereof. For example, the digital twin 358 can be a virtual 2D or 3D model of a city or town (or a part thereof) that reflects the current or a historical traffic situation of the city or town. Generation and maintenance of the digital twin 358 will be discussed in more detail in later sections.

FIG. 4 illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

As will be discussed in more detail in the following sections, the perception device 103 can be detachably or removably coupled to the carrier vehicle 110. For example, the perception device 103 can comprise an attachment arm 502 (see FIGS. 5A, 5B, and 5D) for securing or otherwise coupling the perception device 103 to a window or dashboard of the carrier vehicle 110. As a more specific example, the perception device 103 can be coupled to a front windshield, a rear windshield, a side window, a front dashboard, or a rear deck or dashboard of the carrier vehicle 110.

In some embodiments, the perception device 103 can be coupled to an exterior surface or side of the carrier vehicle 110 such as a front, lateral, or rear exterior surface or side of the carrier vehicle 110. In additional embodiments, the perception device 103 can be coupled to a component or arm extending from the carrier vehicle 110. For example, the perception device 103 can be coupled to a stop arm (i.e., an arm carrying a stop sign) of a school bus.

As previously discussed, the system 100 can comprise perception devices 103 installed in or otherwise coupled to carrier vehicles 110 deployed within a geographic area or municipality. For example, a perception device 103 can be coupled to a front windshield or dash/deck of a bus driving around a city on its daily bus route. Also, for example, a perception device 103 can be coupled to a front windshield or dash/deck of a street sweeper on its daily sweeping route or a garbage/recycling truck on its daily collection route.

It is also contemplated by this disclosure that the perception device 103 can be carried by or otherwise coupled to a micro-mobility vehicle (e.g., an electric scooter). In other embodiments contemplated by this disclosure, the perception device 103 can be carried by or otherwise coupled to a UAV or drone.

FIGS. 5A and 5B illustrate front and right side views, respectively, of one embodiment of the perception device 103. The perception device 103 can comprise a device housing 500 and an attachment arm 502.

The device housing 500 can be substantially shaped as an elongate cuboid having rounded corners and edges. In other embodiments, the device housing 500 can be substantially shaped as a rectangular box, an ovoid, a truncated pyramid, a sphere, or any combination thereof.

In some embodiments, the device housing 500 can be made in part of a polymeric material, a metallic material, or a combination thereof. For example, the device housing 500 can be made in part of a rigid polymeric material such as polycarbonate, acrylonitrile butadiene styrene (ABS), or a combination thereof. The device housing 500 can also be made in a part of an aluminum alloy, stainless steel, titanium, or a combination thereof. In some embodiments, at least portions of the device housing 500 can be made of glass (e.g., the parts covering the image sensor lenses).

As shown in FIGS. 5A and 5B, when the device housing 500 is implemented as an elongate cuboid, the device housing 500 can have a housing length 504, a housing height 506, and a housing depth 508. In some embodiments, the housing length 504 can be between about 150 mm and about 250 mm. For example, the housing length 504 can be about 200 mm. The housing height 506 can be between about 50 mm and 100 mm. For example, the housing height 506 can be about 75 mm. The housing depth 508 can be between about 50 mm and 100 mm. For example, the housing depth 508 can be about 75 mm.

In some embodiments, the attachment arm 502 can extend from a top of the device housing 500. In other embodiments, the attachment arm 502 can also extend from a bottom of the device housing 500. As shown in FIG. 5B, at least one of the linkages of the attachment arm 502 can rotate with respect to one or more of the other linkage(s) of the attachment arm 502 to tilt the device housing 500. The device housing 500 can be tilted to allow a driver of the carrier vehicle 110 or an installer of the perception device 103 to obtain better camera angles or account for a slant or angle of the vehicle's windshield.

The attachment arm 502 can comprise a high bonding adhesive 510 at a terminal end of the attachment arm 502 to allow the attachment arm 502 to be adhered to a windshield (e.g., a front windshield or a rear windshield), window, or dashboard of the carrier vehicle 110. In some embodiments, the high bonding adhesive 510 can be a very high bonding (VHB) adhesive layer or tape, an ultra-high bonding (UHB) adhesive layer or tape, or a combination thereof. As shown in FIGS. 5B and 5E, in one example embodiment, the attachment arm 502 can be configured such that the adhesive 510 faces forward or in a forward direction above the device housing 500. In other embodiments not shown in the figures but contemplated by this disclosure, the adhesive 510 can face downward below the device housing 500 to allow the attachment arm 502 to be secured to a dashboard or deck of the carrier vehicle 110.

In other embodiments contemplated by this disclosure but not shown in the figures, the attachment arm 502 can be detachably or removably coupled to a windshield, window, or dashboard of the carrier vehicle 110 via a suction mechanism (e.g., one or more releasable high-strength suction cups), a magnetic connector, or a combination thereof with or without adhesives. In additional embodiments, the device housing 500 can be fastened or otherwise coupled to an exterior surface or interior surface of the carrier vehicle 110 via screws or other fasteners, clips, nuts and bolts, adhesives, suction cups, magnetic connectors, or a combination thereof.

In further embodiments contemplated by this disclosure but not shown in the figures, the attachment arm 502 can be detachably or removably coupled to a micro-mobility vehicle or a UAV or drone. For example, the attachment arm 502 can be detachably or removably coupled to a handrail/handlebar of an electric scooter. Also, for example, the attachment arm 502 can be detachably or removably coupled to a mount or body of a drone or UAV.

FIGS. 5A-5D illustrate that the device housing 500 can house or contain all of the electronic components (see, e.g., FIG. 2A) of the perception device 103 including the plurality of video image sensors 208. For example, the video image sensors 208 can comprise a first video image sensor 208A, a second video image sensor 208B, a third video image sensor 208C, and a fourth video image sensor 208D.

As shown in FIG. 5A, one or more of the video image sensors 208 can be angled outward or oriented in one or more peripheral directions relative to the other video image sensors 208 facing forward. The perception device 103 can be positioned such that the forward facing video image sensors (e.g., the second video image sensor 208B and the third video image sensor 208C) are oriented in a direction of forward travel of the carrier vehicle 110. In these embodiments, the angled video image sensors (e.g., the first video image sensor 208A and the fourth video image sensor 208D) can be oriented such that the environment surrounding the carrier vehicle 110 or to the periphery of the carrier vehicle 110 can be captured by the angled video image sensors. The first video image sensor 208A and the fourth video image sensor 208D can be angled with respect to the second video image sensor 208B and the third video image sensor 208C.

In the example embodiment shown in FIG. 5A, the device housing 500 can be configured such that the camera or sensor lenses of the forward-facing image video sensors (e.g., the second video image sensor 208B and the third video image sensor 208C) are exposed along the length or long side of the device housing 500 and each of the angled video image sensors (e.g., the first video image sensor 208A and the fourth video image sensor 208D) is exposed along an edge or side of the device housing 500.

When in operation, the forward-facing video image sensors can capture videos of the environment (e.g., the roadway, other vehicles, buildings, or other landmarks) mostly in front of the carrier vehicle 110 and the angled video image sensors can capture videos of the environment mostly to the sides of the carrier vehicle 110. As a more specific example, the angled video image sensors can capture videos of adjacent lane(s), vehicle(s) in the adjacent lane(s), a sidewalk environment including people or objects (e.g., fire hydrants or other municipal assets) on the sidewalk, and buildings facades.

At least one of the video image sensors 208 (e.g., the second video image sensor 208B) can be a license plate recognition (LPR) camera having a fixed-focal or varifocal telephoto lens. In some embodiments, the LPR camera can comprise one or more infrared (IR) filters and a plurality of IR light-emitting diodes (LEDs) that allow the LPR camera to operate at night or in low-light conditions. The LPR camera can capture video images at a minimum resolution of 1920×1080 (or 2 MP). The LPR camera can also capture video at a frame rate of between 1 frame per second and 120 FPS. In some embodiments, the LPR camera can also capture video at a frame rate of between 20 FPS and 80 FPS.

The other video image sensors 208 (e.g., the first video image sensor 208A, the third video image sensor 208C, and the fourth video image sensor 208D) can be ultra-low-light HDR image sensors. The HDR image sensors can capture video images at a minimum resolution of 1920×1080 (or 2MP). The HDR image sensors can also capture video at a frame rate of between 1 frame per second and 120 FPS. In certain embodiments, the HDR image sensors can also capture video at a frame rate of between 20 FPS and 80 FPS. In some embodiments, the video image sensors 208 can be or comprise ultra-low-light CMOS image sensors distributed by Sony Semiconductor Solutions Corporation.

FIG. 5C illustrates that the video image sensors 208 housed within the embodiment of the perception device 103 shown in FIG. 5A can have a combined field of view 512 of greater than 180 degrees. For example, the combined field of view 512 can be about 240 degrees. In other embodiments, the combined field of view 512 can be between 180 degrees and 240 degrees.

FIGS. 5D and 5E illustrate perspective and right side views, respectively, of another embodiment of the perception device 103 having a camera skirt 514. The camera skirt 514 can block or filter out light emanating from an interior of the carrier vehicle 110 to prevent the lights from interfering with the video image sensors 208. For example, when the carrier vehicle 110 is a municipal bus, the interior of the municipal bus can be lit by artificial lights (e.g., fluorescent lights, LED lights, etc.) to ensure passenger safety. The camera skirt 514 can block or filter out such excess light to prevent the excess light from degrading the video footage captured by the video image sensors 208.

As shown in FIG. 5D, the camera skirt 514 can comprise a tapered or narrowed end and a wide flared end. The tapered end of the camera skirt 514 can be coupled to a front portion of the device housing 500. The camera skirt 514 can also comprise a skirt distal edge 516 defining the wide flared end. The skirt distal edge 516 can be configured to contact or press against one portion of the windshield or window of the carrier vehicle 110 when the perception device 103 is adhered or otherwise coupled to another portion of the windshield or window via the attachment arm 502.

As shown in FIG. 5D, the skirt distal edge 516 can be substantially elliptical-shaped or stadium-shaped. In other embodiments, the skirt distal edge 516 can be substantially shaped as a rectangle or oval. For example, at least part of the camera skirt 514 can be substantially shaped as a flattened frustoconic or a trapezoidal prism having rounded corners and edges.

FIG. 5D also illustrates that the combined field of view 512 of the video image sensors 208 housed within the embodiment of the perception device 103 shown in FIG. 5D can be less than 180 degrees. For example, the combined field of view 512 can be about 120 degrees or between about 90 degrees and 120 degrees.

Figure 6A:
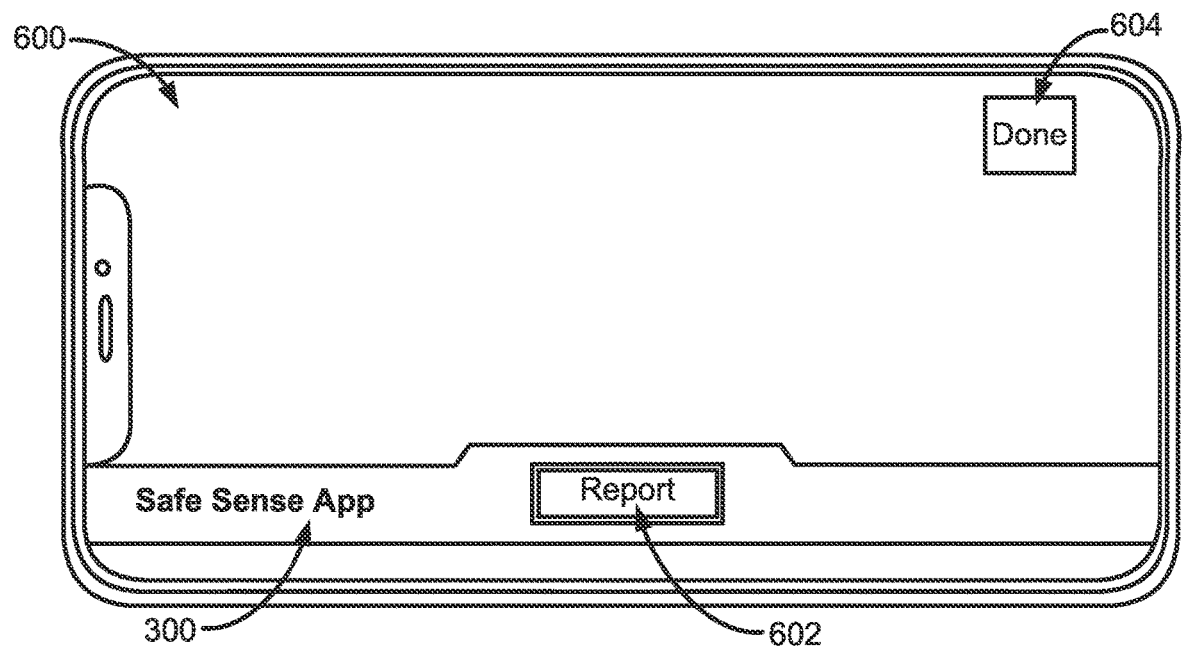
FIG. 6A illustrates one embodiment of a violation reporting graphical user interface (GUI) configured to be displayed on the mobile device.

FIG. 6A illustrates one embodiment of a violation reporting GUI 600 configured to be displayed on the mobile device 102 as part of a traffic violation reporting mobile application 300 running on the mobile device 102. A user carrying the mobile device 102 having an instance of the mobile application 300 downloaded on the mobile device 102 can open the mobile application 300 when the user sees an offending vehicle 114 committing a potential traffic violation. For example, the offending vehicle 114 can be driving, parked, or idling in a restricted area 116 when the offending vehicle 114 is not permitted to do so at a particular time. The user can open the mobile application 300 and apply a user input (e.g., a touch input) to a camera UI icon 812 (see, e.g., FIGS. 8 and 9) to bring up the violation reporting GUI 600.

The user can then apply another user input to a report UI icon 602 to begin capturing image(s) or video(s) 112 of the offending vehicle 114 within the restricted area 116. The mobile application 300 can use the video image sensors or cameras 228 of the mobile device 102 to capture the image(s) or video(s) 112 of the offending vehicle 114 within the restricted area 116.

In some embodiments, the mobile device 102 can automatically begin to capture or record a video of the offending vehicle 114 committing the potential traffic violation in response to a user applying a user input to the report UI icon 602. In certain embodiments, the mobile application 300 can inform the user (e.g., through text prompts, audio instructions, or haptics) to continue capturing the video while moving the mobile device 102 to different locations around the offending vehicle 114. For example, the mobile application 300 can inform the user to capture the video while walking in a circle or semicircle around the offending vehicle 114. This can be done so that the video captures the offending vehicle 114 and at least part of the restricted area 116 from different viewing angles or vantage points. In certain embodiments, the license plate recognition engine 316 can pass video frames from the captured video in real-time to the deep learning model 322 and the mobile application 300 can inform the user to continue moving the mobile device 102 around the offending vehicle 114 until the license plate number 126 of the offending vehicle 114 is recognized or detected by the license plate recognition engine 316.

In other embodiments, the mobile device 102 can automatically capture one or more images of the offending vehicle 114 committing the potential traffic violation in response to a user applying a user input to the report UI icon 602. In these embodiments, the mobile application 300 can inform the user (e.g., through text prompts, audio instructions, or haptics) to move to different locations around the offending vehicle 114 and apply a user input to the report UI icon 602 at each of the different locations to capture the offending vehicle 114 from different viewing angles or vantage points. For example, the mobile application 300 can inform the user to take pictures of the offending vehicle 114 from at least three different viewing angles such that three different sides of the offending vehicle 114 are captured. In certain embodiments, the license plate recognition engine 316 can pass the captured images in real-time to the deep learning model 322 and the mobile application 300 can inform the user to continue taking pictures of the offending vehicle 114 from different viewing angles until the license plate number 126 of the offending vehicle 114 is recognized or detected by the license plate recognition engine 316.

Once the user has finished capturing image(s) or video(s) 112 of the offending vehicle 114 committing the potential traffic violation, the user can apply a user input to an end capture UI icon 604 to terminate the capture session and exit the violation reporting GUI 600. At this point, the mobile device 102 can automatically generate an extended metadata tag 118 associated with the one or more images or videos 112 captured by the mobile device 102. The user can also apply a user input to the end capture UI icon 604 to exit the violation reporting GUI 600 even when no image(s) or video(s) have been captured.

In some embodiments, the violation reporting GUI 600 can also allow a user to upload previously captured image(s) or video(s) 112 to the mobile application 300 via the violation reporting GUI 600. For example, in response to a user applying a user input to the report UI icon 602, the mobile application 300 can present the user with an option to upload a previously captured image or video in lieu of capturing new image(s) or video(s) in real-time.

Figure 6B:
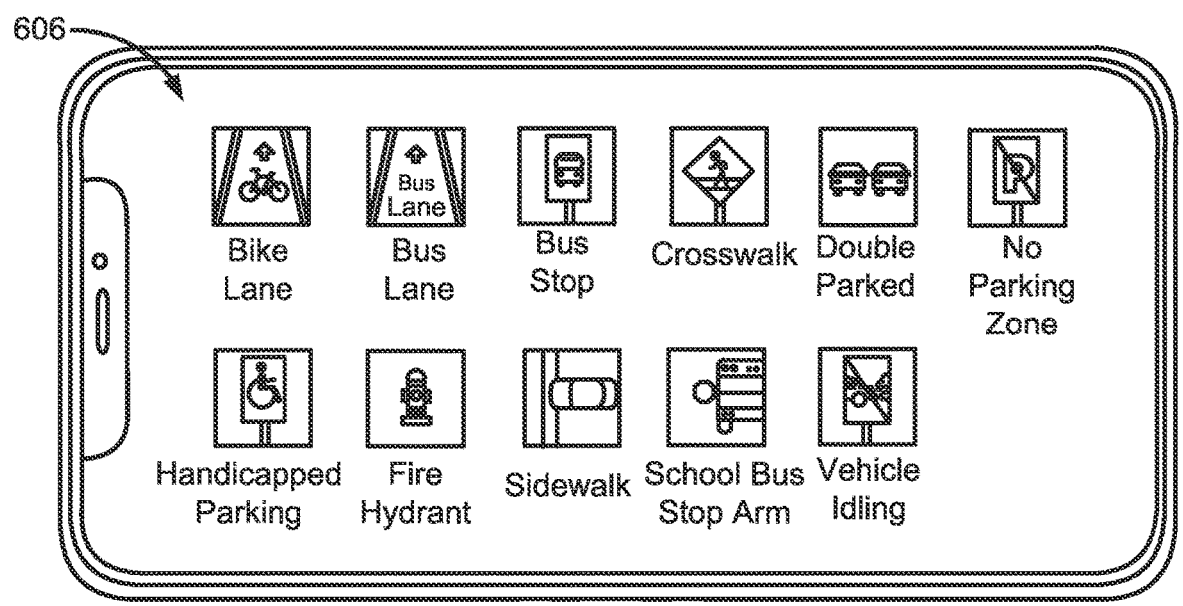
FIG. 6B illustrates one embodiment of an violation selection GUI configured to be displayed on the mobile device.

FIG. 6B illustrates one embodiment of a violation selection GUI 606 configured to be displayed on the mobile device 102 as part of the traffic violation reporting mobile application 300 running on the mobile device 102. In some embodiments, the violation selection GUI 606 can be displayed in response to the user applying a user input to the end capture UI icon 604 (see FIG. 6A). In other embodiments, the violation selection GUI 606 can be displayed automatically once the mobile application 300 has processed the image(s) or video(s) captured by the mobile device 102.

The violation selection GUI 606 can allow a user to manually select or provide input concerning a violation type 128 of the potential traffic violation. As shown in FIG. 6B, the violation type 128 can comprise a bike lane violation, a bus lane violation, a bus stop parking violation, a crosswalk obstruction violation, a double-parking violation, a no-parking zone violation, a handicapped parking violation, a blocked fire hydrant violation, a sidewalk obstruction violation, a school bus stop arm violation, and a vehicle idling violation.

The user can manually select the violation type 128 by applying a user input to a UI icon representing the violation type 128. In some embodiments, the mobile device 102 can use the selection made by the user to create a metadata tag concerning the violation type 128 and include the metadata tag as part of the extended metadata tag 118. In other embodiments, the mobile device 102 can confirm the selection made by the user by using certain image recognition or computer vision tools to recognize text on traffic-related or parking-related signs detected within a vicinity of the offending vehicle 114. In further embodiments, the mobile device 102 can pass image(s) or video(s) captured by the cameras 228 to the deep learning model 308 to detect objects or roadway markings of interest such as fire hydrants, lane markers, crosswalk markings, sidewalks, or school bus stop signs to confirm the selection made by the user. In additional embodiments, the mobile device 102 can determine the violation type 128 exclusively based on the image(s) or video(s) 112 captured by the cameras 228 without any input from the user.

Figure 7A:
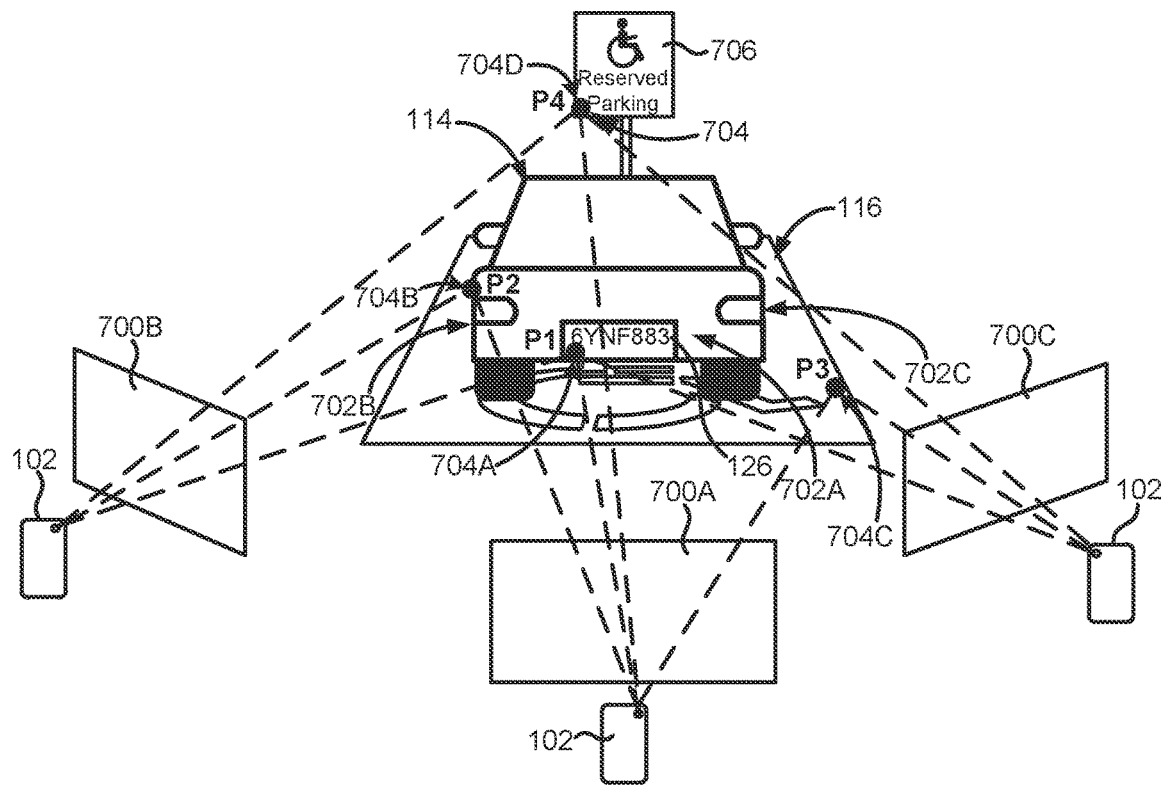
FIG. 7A illustrates a mobile device capturing images or videos of an offending vehicle committing a traffic violation from different viewing angles.
Figure 7B:
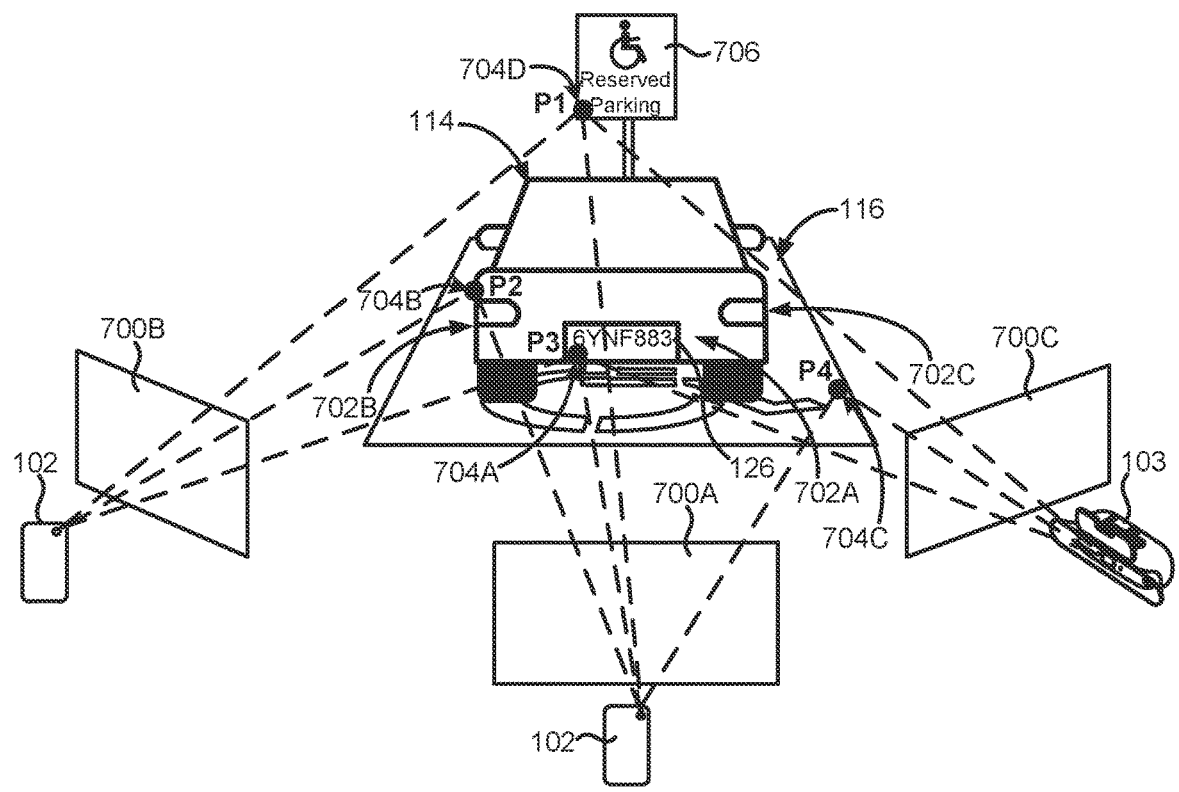
FIG. 7B illustrates a mobile device and a perception device capturing images or videos of an offending vehicle committing a traffic violation from different viewing angles.

FIG. 7A illustrates a scenario where one mobile device 102 captures images or videos 112 of an offending vehicle 114 committing a traffic violation from different viewing angles. FIG. 7B illustrates a scenario similar to the one show in FIG. 7A except one of the images or videos is taken by a perception device 103 rather than the mobile device 102.

The one or more images or videos 112 can include at least a first image or video frame 700A capturing a front or rear 702A of the offending vehicle 114, a second image or video frame 700B capturing a first side 702B of the offending vehicle 114, and a third image or video frame 700C capturing a second side 702C of the offending vehicle 114.

The captured images or video frames (including at least the first image or video frame 700A, the second image or video frame 700B, and the third image or video frame 700C) can be stored in the content lake 107 after being transmitted from the mobile device 102 to the server 104. In some embodiments, the same event ID 320 (see, e.g., FIG. 3) can be associated with all of the captured images or video frames. In other embodiments, the captured images or video frames can be stored in a folder with the event ID 320 as the folder name.

The multi-view co-registration module 352 of the server 104 (see FIG. 3) can perform multi-view co-registration on the images or video frames (including at least the first image or video frame 700A, the second image or video frame 700B, and the third image or video frame 700C) stored in the content lake 107. The multi-view co-registration module 352 can perform the multi-view co-registration by first identifying key points 704 from the multiple images or video frames showing the same potential traffic violation.

The key points 704 can represent key features or salient aspects of the objects detected in the images or video frames. For example, the key points 704 can represent key features or salient aspects of the offending vehicle 114 such as a corner or edge of a part of the body of the vehicle, a light or mirror on the vehicle, a corner or edge of a license plate of the vehicle, or a combination thereof. The key points 704 can also represent key features or salient aspects of the restricted area 116 such as a key feature or salient aspect of a road marking or road feature delineating the restricted nature of the roadway or area. For example, when the restricted area 116 is a handicap parking space or zone, one of the key points 704 can be a point on the edge or corner of a blue-colored parking space or zone.

Besides the offending vehicle 114 and the restricted area 116, the multi-view co-registration module 352 can also identify one or more key points 704 on a nearby object 706 captured in at least some of the images or video frames. In some embodiments, the nearby object 706 can provide further information concerning the potential traffic violation. For example, the nearby object 706 can be a street sign or parking sign located next to the restricted area 116. Also, for example, the nearby object 706 can be a fire hydrant or parking meter located next to the restricted area 116 that can provide additional context concerning the traffic violation. Alternatively, the nearby object 706 can be a non-violation-related object such as a tree or the façade of a nearby building or storefront that can be used as a common reference point.

FIGS. 7A and 7B illustrate that the key points 704 identified by the multi-view co-registration module 352 can comprise at least a first key point 704A, a second key point 704B, a third key point 704C, and a fourth key point 704D. The first key point 704A can be a point on the license plate of the offending vehicle 114. The second key point 704B can be a point along a rear edge of the offending vehicle 114 visible from both the rear and lateral side of the vehicle. The third key point 704C can be a point along an edge of a road or area marking signifying a boundary of the restricted area 116. The fourth key point 704D can be a point at a corner of a parking sign or street sign such as a handicap parking sign located near the offending vehicle 114 and restricted area 116.

Although FIGS. 7A and 7B illustrate four key points 704, it is contemplated by this disclosure and it should be understood by one of ordinary skill in the art that the multi-view co-registration process can involve upwards of hundreds or thousands of key points 704.

As shown in FIGS. 7A and 7B, the first image or video frame 700A can comprise the first key point 704A, the second key point 704B, the third key point 704C, and the fourth key point 704D; the second image or video frame 700B can comprise the first key point 704A, the second key point 704B, and the fourth key point 704D; and the third image or video frame 700C can comprise the first key point 704A, the third key point 704C, and the fourth key point 704D.

In some embodiments, the multi-view co-registration module 352 can use certain modified functions or tools derived from a computer vision library 360 to identify the key points 704 from the various images or video frames. For example, the computer vision library 360 can be an open-source computer vision library such as the OpenCV® library maintained and operated by the Open Source Vision Foundation.

The multi-view co-registration module 352 can then match at least some of the key points 704 from the images or video frames to one another using certain modified functions or tools derived from a computer vision library 360. For example, the multi-view co-registration module 352 can match at least some of the key points 704 from the first image or video frame 700A and the second image or video frame 700B. As a more specific example, the multi-view co-registration module 352 can match at least the first key point 704A, the second key point 704B, and the fourth key point 704D from the first image or video frame 700A with the same points shown in the second image or video frame 700B. Moreover, the multi-view co-registration module 352 can match at least some of the key points 704 from the first image or video frame 700A and the third image or video frame 700C. As a more specific example, the multi-view co-registration module 352 can match at least the first key point 704A, the third key point 704C, and the fourth key point 704D from the first image or video frame 700A with the same points shown in the third image or video frame 700C. Furthermore, the multi-view co-registration module 352 can also match at least some of the key points 704 from the second image or video frame 700B and the third image or video frame 700C.

In some embodiments, the multi-view co-registration module 352 can use certain modified functions or tools derived from one or more photogrammetry libraries 362 or toolkits to match the key points 704 from different images or video frames. For example, the multi-view co-registration module 352 can use modified photogrammetric functions or tools derived from an open-source photogrammetry library such as the OpenMVG library to match the key points 704 from different images or video frames.

The multi-view co-registration module 352 can then generate or construct a virtual 3D model 364 of the offending vehicle 114 committing the potential traffic violation. For example, the virtual 3D models 364 can be a virtual reconstruction of the offending vehicle 114 within at least part of the restricted area 116. The multi-view co-registration module 352 can generate the virtual 3D model 364 of the offending vehicle 114 committing the potential traffic violation using certain modified photogrammetry functions or tools derived from one of the photogrammetry libraries 362. For example, the multi-view co-registration module 352 can use modified photogrammetric functions or tools derived from an open-source photogrammetry library such as the OpenMVS library to generate the virtual 3D model 364 of the offending vehicle 114 within at least part of the restricted area 116. As a more specific example, the multi-view co-registration module 352 can generate the virtual 3D model 364 using photogrammetric techniques such as dense point-cloud reconstruction, mesh reconstruction, mesh refinement, mesh texturing, or a combination thereof. The multi-view co-registration module 352 can apply the photogrammetric functions or tools to the various images or video frames including at least the first image or video frame 700A, the second image or video frame 700B, the third image or video frame 700C, and the fourth image or video frame 700D.

The virtual 3D models 364 generated by the multi-view co-registration module 352 can be shown to a user of the system 100 in response to a request by the user to view the potential traffic violation or similar types of traffic violations. For example, the virtual 3D model 364 generated by the multi-view co-registration module 352 can be included as part of a content feed 904 or a pop-up window or overlay window displayed on an interactive violation map 804. In these embodiments, the virtual 3D model 364 can exclude details of the offending vehicle 114 including a color of the offending vehicle 114, the license plate number 126 of the offending vehicle 114, or certain other distinguishing characteristics of the offending vehicle 114. The virtual 3D models 364 of offending vehicles 114 can be presented to non-governmental users of the system 100 in lieu of the actual captured images or videos 112 (or clips thereof) for privacy concerns.

In some embodiments, the virtual 3D models 364 generated by the multi-view co-registration module 352 can be used by a context reasoning module or certain reasoning logic of the server 104 to determine if a potential traffic violation is indeed a traffic violation or whether the violation should be mitigated. For example, the server 104 can determine that the offending vehicle 114 did not actually commit a traffic violation if not enough of the offending vehicle 114 was within the restricted area 116.

In addition embodiments, the virtual 3D models 364 generated by the multi-view co-registration module 352 can be transmitted to a computing device 130 of a governmental agency or law-enforcement agency for further review by trained agency personnel.

In some embodiments, portions of the virtual 3D models 364 generated by the multi-view co-registration module 352 can be passed as outputs to the digital twin module 346 to help in constructing a digital twin 358 of a municipality where the potential traffic violation occurred. For example, objects detected within certain images or videos 112 captured by the mobile devices 102 or perception devices 103 can be included as virtual objects within the virtual 3D models 364 generated by the multi-view co-registration module 352 and these virtual 3D objects, and their accompanying locations, can be used to populate the digital twin 358.

In this manner, the outputs from the multi-view co-registration module 352 can serve as inputs to the digital twin module 346. Furthermore, the virtual 3D models 364 including all virtual objects within such virtual 3D models 364, can be stored in the content lake 107.

FIG. 7B illustrates a scenario similar to the one show in FIG. 7A except one of the images or videos is taken by a perception device 103 rather than the mobile device 102. Although FIG. 7B shows the perception device 103 capturing one of the images or videos of the potential traffic violation, it is contemplated by this disclosure and it should be understood by one of ordinary skill in the art that the images or videos can also be captured by another mobile device 102 separate from the mobile device 102 shown in FIG. 7B. For example, a first mobile device 102A can capture the first image or video frame 700A and the second image or video frame 700B and a second mobile device 102B can capture the third image or video frame 700C. In further embodiments not shown in the figures, all three images or video frames can be captured by different mobile devices 102 and/or perception devices 103.

As previously discussed, the evidence processing engine 336 of the server 104 (see FIG. 3) can use one or more location tables 326 and time tables 328 built on top of the content lake 107 to determine whether the images or videos 112 received from the different devices are actually associated with the same potential traffic violation. For example, the evidence processing engine 336 of the server 104 can set a rule or heuristic that any images or videos 112 received from devices within 5 meters and 10 minutes of one another is actually of the same potential traffic violation.

The evidence processing engine 336 can then pass all images or videos 112 initially determined to be associated with the same potential traffic violation to the multi-view co-registration module 352. As previously discussed, the multi-view co-registration module 352 can identify key points 704 from images and video frames obtained from the different devices (e.g., the mobile device(s) 102 and the perception device(s) 103) and use certain photogrammetry tools or functions to match at least some of the key points 704 from the various images and video frames to one another. If the multi-view co-registration module 352 determines that there are no key points 704 that match one another or not enough of the key points 704 match one another to satisfy a predetermined key point matching threshold, the multi-view co-registration module 352 can flag the images or videos as not being associated with the same potential traffic violation. In this manner, the multi-view co-registration process can act as a secondary checking mechanism to ensure that a virtual 3D model 364 is not generated or constructed from images or videos of different offending vehicles 114 or different potential traffic violation scenarios.

One technical problem faced by the applications is how to determine if images or videos received from different mobile devices 102 and/or perception devices 103 is related to the same traffic violation. This can be difficult when the server 104 receives videos and images from numerous mobile devices 102 and perception devices 103 at a high-rate. One technical solution discovered and developed by the applicants is to use the multi-view co-registration procedure disclosed herein to identify and match key points from the images or videos received from devices located near one another or received close in time. This can greatly enhance the accuracy of the system 100 and cut down on redundant detections.

In some embodiments, the server 104 can display image(s) or video(s) 112 of an offending vehicle 114 to users only if a virtual 3D model 364 has been successfully generated of the offending vehicle 114 committing a potential traffic violation. For example, if the server 104 determines that only one image or video was captured of an offending vehicle 114 committing a potential traffic violation from one viewing angle, the server 104 can save the one image or video in the content lake 107 until further image(s) or videos are received concerning the same offending vehicle 114 committing the same traffic violation from other viewing angles. This can ensure that the public (in the form of the users of the system 100) is not made aware of any potential traffic violations involving an offending vehicle 114 until there is enough evidentiary content showing the offending vehicle 114 committing the potential traffic violation or that the evidentiary content is at least consistent with one another.

As will be discussed in more detail in later sections, the mobile application 300 running on the mobile device 102 can inform a user of the mobile device 102 (for example, through text prompts, audio instructions, or haptics) to capture image(s) or video(s) of an offending vehicle 114 while moving the mobile device 102 to different locations around the offending vehicle 114. For example, the mobile application 300 can inform the user to capture a video while walking in a circle or semicircle around the offending vehicle 114. This can be done so that the video captures the offending vehicle 114 and at least part of the restricted area 116 from different viewing angles or vantage points and that video frames can be extracted from the video showing multiple sides of the offending vehicle 114.

In certain embodiments, the license plate recognition engine 316 of the server 104 can pass video frames from the captured video in real-time to the deep learning model 322 and the mobile application 300 can inform the user to continue moving the mobile device 102 around the offending vehicle 114 until a license plate number 126 of the offending vehicle 114 is recognized or detected by the license plate recognition engine 316.

Moreover, the mobile application 300 can inform the user (e.g., through text prompts, audio instructions, or haptics) to move to different locations around the offending vehicle 114 when capturing images of the offending vehicle 114 committing the potential traffic violation. For example, the mobile application 300 can inform the user to take pictures of the offending vehicle 114 from at least three different viewing angles such that three different sides (e.g., the front/rear and the two lateral sides) of the offending vehicle 114 are captured. In certain embodiments, the license plate recognition engine 316 can pass the captured images in real-time to the deep learning model 322 and the mobile application 300 can inform the user to continue taking pictures of the offending vehicle 114 from different viewing angles until the license plate number 126 of the offending vehicle 114 is recognized or detected by the license plate recognition engine 316.

FIG. 8 illustrates one embodiment of a violation map GUI 800 configured to be displayed on a mobile device 102 as part of the mobile application 300 running on the mobile device 102. A user of the mobile device 102 can access the violation map GUI 800 by applying a user input (e.g., a touch input) to a map UI icon 802 located along a banner positioned at the bottom of the various mobile application GUI pages.

In response to the user applying the user input to the map UI icon 802, the mobile device 102 can transmit a request to the server 104 to view an interactive violation map 804 based on a geographical area parameter 136 and the current location of the mobile device 102 obtained from the positioning unit 230 of the mobile device 102. In some embodiments, the geographical area parameter 136 can be a parameter previously set by the user (e.g., within 5 miles of the current location of the mobile device 102). In other embodiments, the geographical area parameter 136 can be a default parameter set by the mobile application 300. In certain embodiments, the mobile device 102 can transmit both the geographical area parameter 136 and a temporal parameter 806 such as all violations within the last hour, 4 hours, day, week, etc. The temporal parameter 806 can be a parameter previously set by the user or a default temporal parameter. The temporal parameter 806 can be applied along with the geographical area parameter 136 so as not to overwhelm the user with too many results shown in the interactive violation map 804. The user can subsequently adjust the geographical area parameter 136 and the temporal parameter 806 after the violation map GUI 800 is displayed on the mobile device 102.

In response to the server 104 receiving the request from the mobile device 102, the map module 338 of the server 104 can query the database tables 324 using at least one of the geographical area parameter 136 and the temporal parameter 806. For example, the map module 338 can query at least the location table 326 and the time table 328. The map module 338 can then generate an instance of the interactive violation map 804 based in part on results obtained from the query of the location table 326 and the time table 328.

The interactive violation map 804 can be generated based on maps generated and maintained by the map module 338. For example, the interactive violation map 804 can be generated in part using semantic maps 356 generated and maintained by the map module 338. For example, the interactive violation map 804 can be a semantic map 356 built on top of an existing standard-definition map such as a geometric map.

As shown in FIG. 8, the interactive violation map 804 can show a number of pin drop UI icons 808 indicating the locations of reported traffic violations satisfying the geographical area parameter 136 and/or the temporal parameter 806 set by the user or set by the mobile application 300. The pin drop UI icons 808 can also display a graphic or symbol associated with a particular violation type 124. A user can apply a user input (e.g., a touch input) to the pin drop UI icon 808 to cause the violation map GUI 800 to display a pop-up window 810 or panel showing additional details concerning the reported traffic violation.

In some embodiments, the pop-up window 810 or panel can show a thumbnail of one or more images or videos 112 (or a clip thereof) captured by a reporting user concerning the reported traffic violation. In these embodiments, at least part of the image or video clip can be blurred out or obfuscated by the privacy module 348 of the server 104. The images or videos 112 can be retrieved from the content lake 107.

In other embodiments, the pop-up window 810 can display a virtual 3D model 364 of the offending vehicle 114 committing the reported traffic violation. In certain embodiments, the server 104 will only include a potential traffic violation on the interactive violation map 804 if a virtual 3D model 364 of the offending vehicle 114 committing the potential traffic violation was generated by the multi-view co-registration module 352. In further embodiments, the server 104 will only include a potential traffic violation on the interactive violation map 804 if pictures or videos were taken of the offending vehicle 114 from different viewing angles showing at least three sides of the offending vehicle 114.

The pop-up window 810 or panel can also display additional information concerning the reported traffic violation including the violation time 122 and the violation location 120.

Figure 9:
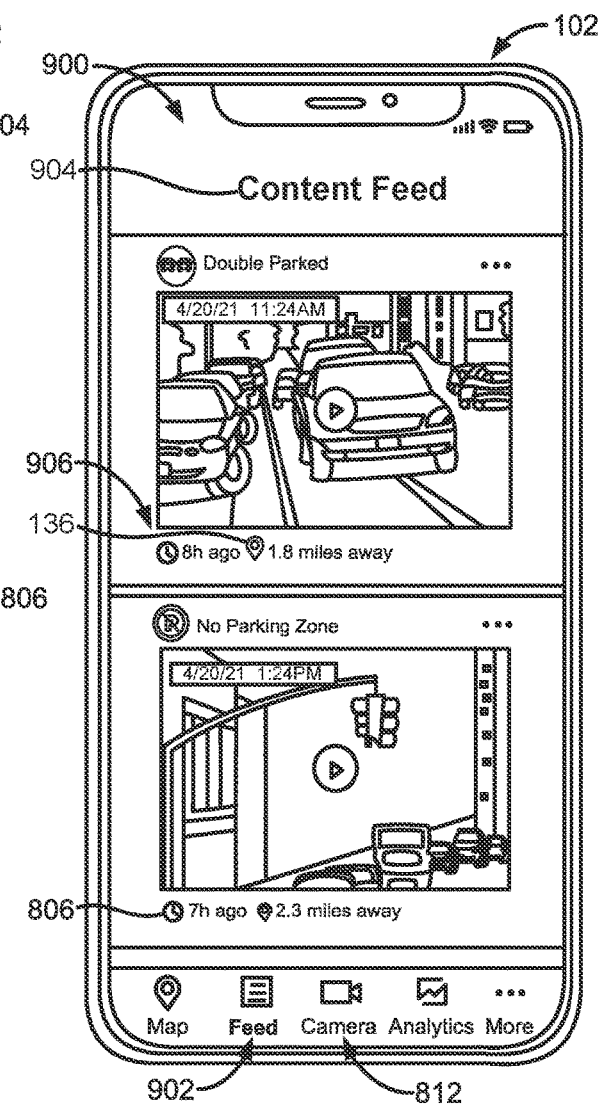
FIG. 9 illustrates one embodiment of a content feed GUI configured to be displayed on the mobile device.

FIG. 9 illustrates one embodiment of a content feed GUI 900 configured to be displayed on the mobile device 102 as part of the mobile application 300. A user of the mobile device 102 can access the content feed GUI 900 by applying a user input (e.g., a touch input) to a feed UI icon 902 located along a banner positioned at the bottom of the various mobile application GUI pages.

In response to the user applying the user input to the feed UI icon 902, the mobile device 102 can transmit a request to the server 104 to view a scrollable content feed 904 based on one or more feed parameters 906. The mobile device 102 can subscribe to one or more content feeds 904 based on one or more feed parameters 906. For example, a user can request that certain content feed(s) 904 are displayed as part of the content feed GUI 900 once the user applies a user input to the feed UI icon 902.

The mobile device 102 can also transmit its own current location obtained from the positioning unit 230 of the mobile device 102. The feed parameter(s) 906 can be any one of or a combination thereof the geographic area parameter 136, the temporal parameter 806, the violation type 128, a reporting user, a reporting device, or a combination thereof. The mobile application 300 can initially render the content feed 904 based on a default feed parameter 906 or a previously saved feed parameter 906.

The content feed 904 can be a scrollable list or collection of potential traffic violations reported by users of the system 100. For example, the content feed 904 can comprise data, information, and images or videos 112 (or clips thereof) of potential traffic violations meeting at least one of the feed parameters 906. The images or videos 112 can be retrieved from the content lake 107.

For example, the content feed 904 can be a scrollable list of all potential traffic violations reported within the last 24 hours and located within a 5 mile radius of the current location of the mobile device 102. In other example embodiments, the content feed 904 can be a scrollable list of handicap-parking violations submitted by a particular user.

The server 104 can generate the content feeds 904 by querying the database tables 324 using the feed parameter(s) 906 requested by the user. For example, the content feed module 340 of the server can query any of the location table 326, the time table 328, the event table 330, the user table 332, the device table 334, or a combination thereof using the feed parameter(s) 906. The map module 338 can then generate an instance of the content feed 904 based in part on results obtained from the query of the database tables 324.

In some embodiments, the content feed 904 can show thumbnails of image(s) or video clips of videos captured by reporting users concerning the reported traffic violations. In these embodiments, at least a portion of each of the images or video clips can be blurred out or obfuscated by the privacy module 348 of the server 104. In other embodiments, the content feed 904 can comprise at least one thumbnail of a virtual 3D model 364 of an offending vehicle 114 committing a reported traffic violation.

The content feed 904 can be updated in response to a user refreshing the page comprising the content feed GUI 900 or in response to the user applying another user input to the feed UI icon 902.

In some embodiments, the content feed 904 can be automatically updated by the content feed module 340. A subscribing mobile device 102 can receive a notification (e.g., a push notification) once the content feed 904 has been automatically updated.

Figure 10:
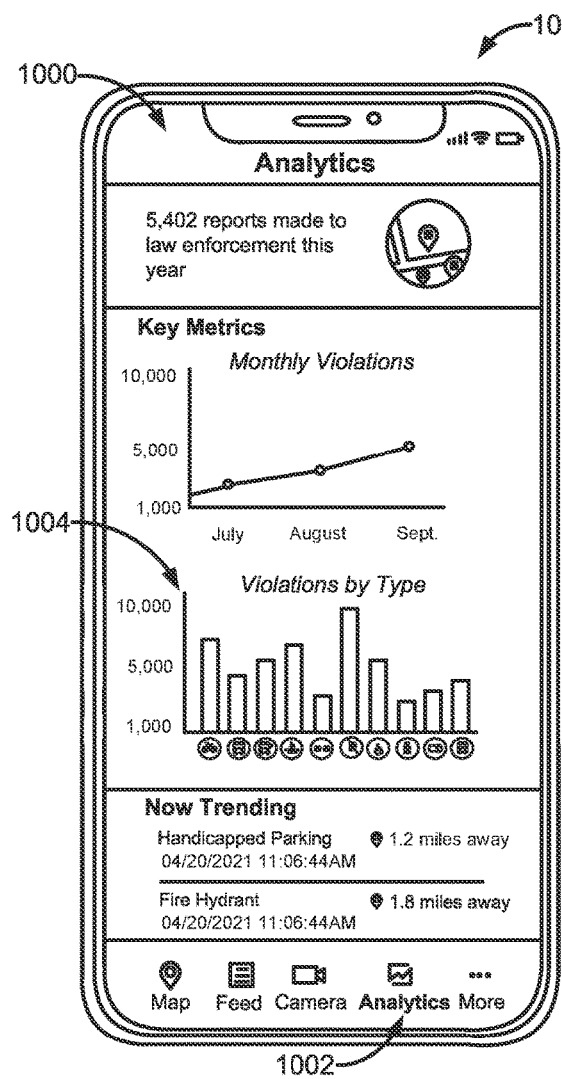
FIG. 10 illustrates one embodiment of an analytics GUI configured to be displayed on the mobile device.

FIG. 10 illustrates one embodiment of an analytics GUI 1000 configured to be displayed on the mobile device 102 as part of the mobile application 300. A user of the mobile device 102 can access the analytics GUI 1000 by applying a user input (e.g., a touch input) to an analytics UI icon 1002 located along a banner positioned at the bottom of the various mobile application GUI pages.

In response to the user applying the user input to the analytics UI icon 1002, the mobile device 102 can transmit a request to the server 104 to view certain insights or analytics 1004 concerning the potential traffic violations reported by users of the system 100. As shown in FIG. 10, the insights or analytics 1004 can be displayed as graphs, charts, text output, or other types of data through the analytics GUI 1000.

The analytics and insights module 342 can generate the graphs, charts, and text output by querying one or more of the database tables 324. The analytics and insights module 342 can also build more sophisticated database tables on top of the underlying database tables 324. For example, the analytics and insights module 342 can build certain SQL or NoSQL (e.g., key-value) databases on top of the underlying database tables 324 or using the extended metadata tags 118 stored in the content lake 107.

For example, the graphs, charts, and text output can convey information concerning the number of traffic violations reported in a given week, month, or year, the number of traffic violations reported in a designated (e.g., geofenced) area, or a combination thereof. Moreover, analytics and insights module 342 can also provide insights in real-time or near-real-time concerning traffic violations reported near a user.

The graphs, charts, and text output can be prepared in response to certain parameters set by the user. In other embodiments, the graphs, charts, and text output can be prepared in response to certain default parameters set by an administrator of the system 100 or the mobile application 300.

The insights or analytics 1004 can also comprise data or graphics indicating certain traffic violation trends and/or metrics. The traffic violation trends and/or metrics can be organized by violation type 128. The traffic violation trends and/or metrics can also be organized by one or more temporal parameters 806, a geographical area parameter 136, or a combination thereof.

Figure 11:
FIG. 11 illustrates one embodiment of a rewards GUI configured to be displayed on a mobile device to incentivize a user of the mobile device to report traffic violations.

FIG. 11 illustrates one embodiment of a rewards GUI 1100 configured to be displayed on a mobile device 102 as part of the mobile application 300 to incentivize a user of the mobile device 102 to report traffic violations.

The engagement engine 344 of the server 104 can be configured to increment a reward balance of a reward account associated with a user of the system 100 in response to receiving one or more image(s) or video(s) 112 from a mobile device 102 associated with the user. For example, the engagement engine 344 can increment the reward balance of the user by providing the user with digital reward points 1102 or tokens. The digital reward points 1102 or tokens earned by the user can be redeemable for gift cards or actual fiat currency. In other embodiments, the digital reward points 1102 or tokens earned by the user can be redeemable for cryptocurrency or cryptocurrency can be deposited directly into a reward account of the user in lieu of the rewards points 1102.

In some embodiments, the user can earn the same amount of digital reward points 1102 or tokens for each potential traffic violation reported. In other embodiments, the user can earn more digital reward points 1102 or tokens for reporting certain types of violation over others (e.g., the user can earn more digital reward points 1102 for reporting a school bus stop arm violation than a bus or bike lane violation). In these and other embodiments, the engagement engine 344 of the server 104 can also offer bounties when the analytics and insights module 342 determines that certain traffic violations are on the rise based on the rate at which such violations are being reported by users or based on metrics or law-enforcement data obtained from governmental transportation agencies or law-enforcement agencies.

Figure 12:
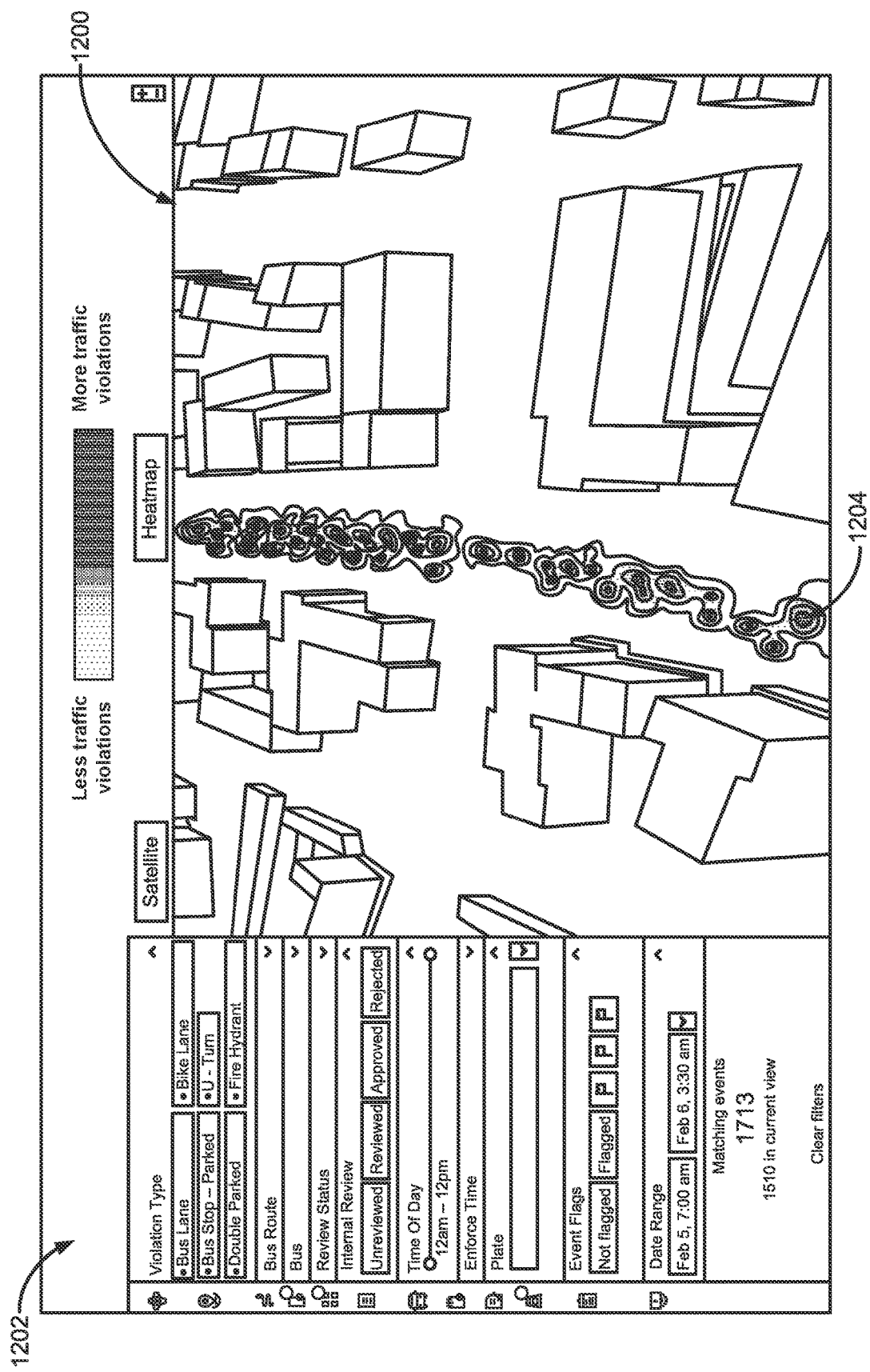
FIG. 12 illustrates one embodiment of a user dashboard GUI configured to be displayed on a computing device of a user of the system.

FIG. 12 illustrates one embodiment of a traffic violation heatmap 1200 that can be rendered based on a digital twin 358 generated and maintained by the digital twin module 346 of the server 104 (see FIG. 3).

The digital twin 358 can be a comprehensive digital model or virtual representation of a municipality (or a part thereof) comprising digital models of buildings, roadways, and other municipal transportation or traffic-related assets. The digital twin 358 can be constructed from the ground-up based on roadways (including lanes on such roadways) and objects automatically detected by the various deep learning models of the system 100 from the images and videos 112 submitted by the mobile devices 102 and perception devices 103 communicatively coupled to the server 104.

The objects detected can comprise dynamic objects such as vehicles, pedestrians, and bicycles. Moreover, the objects detected can also comprise static objects such as buildings or other landmarks, sidewalks, curbs, crosswalks, lane dividers, lane lines, traffic lights, traffic-related signs such as stop signs, parking-related signs, parking meters, parking spaces, and trees or other types of plants managed by a municipality.

The digital twin 358 can be constructed starting with the various semantic maps 356 generated by the map module 338 of the server 104. The detected objects can then be added to the semantic maps 356 based on their locations as recorded or logged by the mobile devices 102 and perception devices 103. The reported traffic violations including any virtual 3D models 364 can then be added to the digital twin 358. The locations 120 and times 122 (in the form of timestamps) of such reported traffic violations can be extracted from the extended metadata tags 118 of such reported traffic violations and be used by the digital twin module 346 to place the violations in the correct time and space.

In some embodiments, the digital twin 358 can be implemented as a time-series database. For example, the time-series database can be constructed using tools from an open-source database such as the TimescaleDB maintained by Timescale, Inc. In other embodiments, the digital twin 358 can be implemented as a relational database.

The digital twin 358 can also receive data or information concerning traffic patterns/conditions, traffic accidents, and traffic violations from one or more third-party traffic databases, third-party traffic sensors, or a combination thereof. The third-party traffic databases can be open-source or proprietary databases concerning historical or real-time traffic conditions or patterns. For example, the third-party traffic databases can include an Esri™ traffic database, a Google™ traffic database, or a combination thereof. The third-party traffic sensors can comprise stationary sensors deployed in a municipal environment to detect traffic patterns or violations. For example, the third-party traffic sensors can include municipal red-light cameras, intersection cameras, toll-booth cameras or toll-lane cameras, parking-space sensors, or a combination thereof.

As shown in FIG. 12, the traffic violation heatmap 1200 can be displayed as part of a user dashboard GUI 1202. The user dashboard GUI 1202 can be configured to be displayed on a mobile device 102 or a computing device 130. The user dashboard GUI 1202 can be used by an administrator of the system 100 or governmental personnel (e.g., law-enforcement personnel, transportation agency personnel, urban planner, etc.) to obtain insights concerning a municipality's transportation and traffic patterns, including a municipality's traffic violation patterns and trends.

The traffic violation heatmap 1200 can display one or more traffic violation graphical indicators 1204. The traffic violation graphical indicators 1204 can provide a visual representation of the amount of traffic violations reported by the users of the system 100. For example, the traffic violation graphical indicators 1204 can provide a visual indication of the number of traffic violations detected along a certain street or road in a municipality. The traffic violation graphical indicators 1204 can be graphical icons of different colors and/or different color intensities. In some embodiments, a continuous color scale or a discrete color scale can be used to denote the level of reported violations. More specifically, when the traffic violation graphical indicators 1204 are of different colors, a red-colored indicator (e.g., a red-colored circle) can denote a high level of violations or that the location is a hotspot of traffic violations and a green-colored indicator (e.g., a green-colored circle) can denote a low level of traffic violations. In these and other embodiments, a darker-colored indicator can denote a high level of violations (or an even higher level of violations, e.g., a dark red circle) and a lighter-colored indicator can denote a low level of violations (or an even lower level of violations, e.g., a light green circle).

The traffic violation heatmap 1200 can be updated based on traffic violations reported in real-time or near-real-time by the mobile devices 102, the deployed perception devices 103, third-party traffic databases, third-party traffic sensors, or any combination thereof.

Governmental personnel or civic leaders who have access to the user dashboard GUI 1202 can use the traffic violation heatmap 1200 and other maps, graphics, or analytics displayed via the user dashboard GUI 1202 to gain a better understanding of a municipality's mobility patterns and traffic challenges. By doing so, the governmental personnel or civic leaders can make more informed choices concerning the enactment of new traffic rules or the enforcement of current traffic rules. Moreover, the governmental personnel or civic leaders can make more informed urban planning decisions.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method for providing traffic violation information, comprising:
   receiving, at a server, images or videos captured by a plurality of mobile devices of potentially one vehicle committing one traffic violation or potentially multiple vehicles committing multiple traffic violations and extended metadata tags associated with the images or videos, wherein the mobile devices are communicatively coupled to the server;
   storing the images or videos and the extended metadata tags as unstructured content in a content lake accessible to the server, wherein the extended metadata tags comprise locations of the mobile devices when the mobile devices captured the images or videos, times recorded by the mobile devices when the mobile devices captured the images or videos, vehicle types of vehicles captured by the images or videos obtained as outputs of object-detection deep learning models running on the mobile devices or the server, and license plate numbers of the vehicles captured by the images or videos obtained as outputs of license-plate recognition deep learning models running on the mobile devices or the server;
   generating or updating, using one or more processors of the server, a plurality of database tables in a database layer on top of the content lake based in part on parsing the extended metadata tags when at least one of a temporal threshold and a submission threshold is met, wherein the images or videos are organized and stored in the database tables according the parsed extended metadata tags;
   determining whether the images or videos received from the plurality of mobile devices are associated with one vehicle committing one traffic violation based in part on the database tables generated and based in part on identifying key points from the images or videos and matching the key points from the images or videos through a multi-view co-registration procedure;
   receiving a request from another mobile device to view traffic violation content based on at least one of a geographical area parameter and a temporal parameter;
   querying the database tables using at least one of the geographical area parameter and the temporal parameter and retrieving at least one image or video of the one vehicle committing the one traffic violation from the content lake; and
   generating a graphical user interface (GUI) to be displayed via the other mobile device showing the traffic violation content, wherein the traffic violation content comprises the at least one image or video of the one vehicle committing the one traffic violation.

2. The method of claim 1, wherein the images or videos captured by the plurality of mobile devices comprise at least a first image or video frame capturing at least part of a front or rear of the vehicle, a second image or video frame capturing at least part of a first side of the vehicle, and a third image or video frame capturing at least part of a second side of the vehicle, and wherein the method further comprises:
   performing the multi-view co-registration procedure on the first image, the second image, and the third image by:
      identifying the key points from the first image, the second image, and the third image,
      matching at least some of the key points from the first image and the second image, and
      matching at least some of the key points from the first image and the third image; and
   generating a virtual three-dimensional (3D) model of the vehicle within at least part of a restricted area by applying photogrammetry tools to at least the first image, the second image, and the third image.

3. The method of claim 1, wherein the images or videos captured by the plurality of mobile devices comprise at least a first image or video frame capturing at least part of a front or rear of the vehicle and a second image or video frame capturing at least part of a first side of the vehicle,
and wherein the method further comprises:
receiving, at the server, a third image or video frame captured by a perception device communicatively coupled to the server of the same vehicle committing the same potential traffic violation, wherein the third image or video frame captures at least part of a second side of the vehicle;
performing the multi-view co-registration procedure on the first image, the second image, and the third image by:
identifying the key points from the first image, the second image, and the third image,
matching at least some of the key points from the first image and the second image, and
matching at least some of the key points from the first image and the third image; and
generating a virtual three-dimensional (3D) model of the vehicle within at least part of a restricted area by applying photogrammetry tools to at least the first image, the second image, and the third image.

4. The method of claim 1, wherein the request received from the other mobile device is a content feed request to subscribe to a content feed based on one or more feed parameters and wherein the GUI comprises a scrollable content feed displaying the at least one image or video of the vehicle and data concerning the traffic violation from the content lake, wherein the content feed is generated based on results obtained by querying the database tables using the one or more feed parameters, wherein the content feed is configured to automatically update, and wherein the other mobile device is configured to receive a notification when the content feed is automatically updated.

5. The method of claim 1, wherein the plurality of database tables comprise database tables organized by a location of the traffic violation, a time of the traffic violation, a violation type, a submitting user, and a submitting device.

6. The method of claim 1, wherein the plurality of database tables are generated or updated when a number of traffic violations reported meets the submission threshold.

7. The method of claim 1, further comprising incrementing a reward balance of a reward account associated with a user of one of the mobile devices in response to receiving one or more images or videos from the mobile device.

8. The method of claim 1, further comprising applying an obfuscating filter of a preconfigured privacy filter level to an object automatically detected in the images or videos, and wherein the traffic violation content comprises at least one image or video with the object obfuscated using the obfuscating filter.

9. The method of claim 1, further comprising generating a digital twin of a municipality using, in part, objects detected using the object-detection deep learning model running on each of the mobile devices from the images or videos captured by the mobile devices and wherein the digital twin comprises virtual objects representing the objects detected within the images or videos captured.

10. The method of claim 1, further comprising receiving, at the server, information concerning a violation type from one of the mobile devices concerning the traffic violation, wherein the violation type is selected in response to a user input applied to a violation selection GUI displayed via the mobile device.

11. The method of claim 1, further comprising receiving, at the server, additional images or videos captured by a perception device using one or more video image sensors of the perception device, wherein the additional images or videos are stored in the content lake, wherein the perception device is coupled to a carrier vehicle, and wherein the additional images or videos are captured by the one or more video image sensors of the perception device while the carrier vehicle is in motion.

12. A system for providing traffic violation information, comprising:
a server communicatively coupled to a plurality of mobile devices, wherein the server comprises one or more server processors programmed to:
receive images or videos of potentially one vehicle committing one traffic violation or potentially multiple vehicles committing multiple traffic violations and extended metadata tags associated with the images or videos, wherein the images or videos are captured by a plurality of mobile devices;
store the images or videos and the extended metadata tags as unstructured content in a content lake accessible to the server, wherein the extended metadata tags comprise locations of the mobile devices when the mobile devices captured the images or videos, times recorded by the mobile devices when the mobile devices captured the images or videos, vehicle types of vehicles captured by the images or videos obtained as outputs of object-detection deep learning models running on the mobile devices or the server, and license plate numbers of the vehicles captured by the images or videos obtained as outputs of license-plate recognition deep learning models running on the mobile devices or the server;
generate or update a plurality of database tables in a database layer on top of the content lake based in part on parsing the extended metadata tags when at least one of a temporal threshold and a submission threshold is met, wherein the images or videos are organized and stored in the database tables according to the parsed extended metadata tags;
determine whether the images or videos received from the plurality of mobile devices are associated with one vehicle committing one traffic violation based in part on the database tables generated and based in part on identifying key points from the images or videos and matching the key points from the images or videos through a multi-view co-registration procedure;
receiving a request from another one of the mobile devices to view traffic violation content based on at least one of a geographical area parameter and a temporal parameter;
query the database tables using at least one of the geographical area parameter and the temporal parameter and retrieve at least one image or video of the one vehicle committing the one traffic violation from the content lake; and
generate a graphical user interface (GUI) to be displayed via the other one of the mobile devices showing the traffic violation content, wherein the traffic violation content comprises the at least one image or video of the one vehicle committing the one traffic violation.

13. The system of claim 12, wherein the images or videos captured by the plurality of mobile devices comprise at least a first image or video frame capturing at least part of a front or rear of the vehicle, a second image or video frame capturing at least part of a first side of the vehicle, and a third image or video frame capturing at least part of a second side of the vehicle, and wherein the one or more server processors are further programmed to:
  perform the multi-view co-registration procedure on the first image, the second image, and the third image by:
    identifying the key points from the first image, the second image, and the third image,
    matching at least some of the key points from the first image and the second image, and
    matching at least some of the key points from the first image and the third image; and
  generate a virtual three-dimensional (3D) model of the vehicle within at least part of a restricted area by applying photogrammetry tools to at least the first image, the second image, and the third image.

14. The system of claim 12, further comprising a plurality of perception devices communicatively coupled to the server, wherein each of the perception devices is coupled to a carrier vehicle, wherein the one or more server processors are further programmed to:
  receive, from the perception devices, additional images or videos captured by video image sensors of the perception devices; and
  store the additional images or videos in the content lake, wherein at least some of the images or videos are captured by a perception device while the carrier vehicle is in motion.

15. The system of claim 14, wherein the images or videos captured by the plurality of mobile devices comprise at least a first image or video frame capturing at least part of a front or rear of the vehicle and a second image or video frame capturing at least part of a first side of the vehicle, and wherein the one or more server processors are further programmed to:
  receive a third image or video frame captured by one of the perception devices of the same vehicle committing the same traffic violation, wherein the third image or video frame captures at least part of a second side of the vehicle;
  perform the multi-view co-registration procedure on the first image, the second image, and the third image by:
    identifying the key points from the first image, the second image, and the third image,
    matching at least some of the key points from the first image and the second image, and
    matching at least some of the key points from the first image and the third image; and
  generate a virtual three-dimensional (3D) model of the vehicle within at least part of a restricted area by applying photogrammetry tools to at least the first image, the second image, and the third image.

16. The system of claim 12, wherein the one or more server processors are further programmed to apply an obfuscating filter of a preconfigured privacy filter level to an object automatically detected in the images or videos, and wherein the traffic violation content comprises at least one image or video with the object obfuscated using the obfuscating filter.

17. The system of claim 12, wherein the one or more server processors are further programmed to generate a digital twin of a municipality using, in part, objects detected using the object-detection deep learning model running on each of the mobile devices from the images or videos captured by the mobile devices and wherein the digital twin comprises virtual objects representing the objects detected within the images or videos captured.

18. A non-transitory computer-readable medium comprising machine-executable instructions stored thereon, wherein the instructions comprise the steps of:
  receiving, at a server, images or videos captured by a plurality of mobile devices of potentially one vehicle committing one traffic violation or potentially multiple vehicles committing multiple traffic violations and extended metadata tags associated with the images or videos, wherein the mobile devices are communicatively coupled to the server;
  storing the images or videos and the extended metadata tags as unstructured content in a content lake accessible to the server, wherein the extended metadata tags comprise locations of the mobile devices when the mobile devices captured the images or videos, times recorded by the mobile devices when the mobile devices captured the images or videos, vehicle types of vehicles captured by the images or videos obtained as outputs of object-detection deep learning models running on the mobile devices or the server, and license plate numbers of the vehicles captured by the images or videos obtained as outputs of license-plate recognition deep learning models running on the mobile devices or the server;
  generating or updating a plurality of database tables in a database layer on top of the content lake based in part on parsing the extended metadata tags when at least one of a temporal threshold and a submission threshold is met, wherein the images or videos are organized and stored in the database tables according to the parsed extended metadata tags;
  determining whether the images or videos received from the plurality of mobile devices are associated with one vehicle committing one traffic violation based in part on the database tables generated and based in part on identifying key points from the images or videos and matching the key points from the images or videos through a multi-view co-registration procedure;
  receiving a request from another mobile device to view traffic violation content based on at least one of a geographical area parameter and a temporal parameter;
  querying the database tables using at least one of the geographical area parameter and the temporal parameter and retrieving at least one image or video of the one vehicle committing the one traffic violation from the content lake; and
  generating a graphical user interface (GUI) to be displayed via the other mobile device showing the traffic violation content, wherein the traffic violation content comprises the at least one image or video of the one vehicle committing the one traffic violation.

19. The non-transitory computer-readable medium of claim 18, wherein the images or videos captured by the plurality of mobile devices comprise at least a first image or video frame capturing at least part of a front or rear of the vehicle, a second image or video frame capturing at least part of a first side of the vehicle, and a third image or video frame capturing at least part of a second side of the vehicle, and wherein the instructions further comprise the steps of:
  performing the multi-view co-registration procedure on the first image, the second image, and the third image by:
    identifying the key points from the first image, the second image, and the third image, matching at least some of the key points from the first image and the second image, and matching at least some of the key points from the first image and the third image; and generating a virtual three-dimensional (3D) model of the vehicle within at least part of a restricted area by applying photogrammetry tools to at least the first image, the second image, and the third image.

20. The non-transitory computer-readable medium of claim 18, wherein the instructions further comprise the step of generating a digital twin of a municipality using, in part, objects detected using the object-detection deep learning model running on each of the mobile devices from the images or videos captured by the mobile devices and wherein the digital twin comprises virtual objects representing the objects detected within the images or videos captured.

\* \* \* \* \*